United States Patent
Englander et al.

(10) Patent No.: US 10,035,460 B2
(45) Date of Patent: Jul. 31, 2018

(54) ASYMMETRIC SECTIONED CONVEX MIRRORS

(71) Applicant: Rosco, Inc., Jamaica, NY (US)

(72) Inventors: Benjamin Englander, Woodmere, NY (US); Julian Serer, Plainview, NY (US)

(73) Assignee: ROSCO, INC., Jamaica, NY (US)

(*) Notice: Subject to any disclaimer, the term of this patent is extended or adjusted under 35 U.S.C. 154(b) by 0 days.

(21) Appl. No.: 15/091,292

(22) Filed: Apr. 5, 2016

(65) Prior Publication Data

US 2016/0318449 A1 Nov. 3, 2016

Related U.S. Application Data

(60) Continuation of application No. 14/218,340, filed on Mar. 18, 2014, now Pat. No. 9,302,625, which is a division of application No. 12/208,914, filed on Sep. 11, 2008, now Pat. No. 8,672,494, application No. 15/091,292, which is a continuation-in-part of application No. 11/619,410, filed on Jan. 3, 2007, now Pat. No. 7,517,100.

(60) Provisional application No. 60/971,334, filed on Sep. 11, 2007, provisional application No. 60/855,779, filed on Nov. 1, 2006.

(51) Int. Cl.
| | |
|---|---|
| *B60R 1/06* | (2006.01) |
| *G02B 5/10* | (2006.01) |
| *B60R 1/08* | (2006.01) |
| *B60R 1/10* | (2006.01) |
| *B60R 1/00* | (2006.01) |
| *G02B 5/09* | (2006.01) |

(52) U.S. Cl.
CPC ............. *B60R 1/082* (2013.01); *B60R 1/00* (2013.01); *B60R 1/007* (2013.01); *B60R 1/06* (2013.01); *B60R 1/10* (2013.01); *G02B 5/09* (2013.01); *G02B 5/10* (2013.01)

(58) Field of Classification Search
CPC .. B60R 1/06; B60R 1/08; B60R 1/081; B60R 1/082; B60R 1/10; B60R 1/007; G02B 5/10
USPC .................. 359/850, 851, 864, 868, 869
See application file for complete search history.

(56) References Cited

U.S. PATENT DOCUMENTS

| | | | |
|---|---|---|---|
| 1,768,354 | A | 6/1930 | Falge |
| 2,455,919 | A | 12/1948 | Daon |
| 2,778,273 | A | 1/1957 | Fellmeth |

(Continued)

FOREIGN PATENT DOCUMENTS

| | | | |
|---|---|---|---|
| GB | 2293151 | * | 3/1996 |
| JP | 57186553 | | 11/1982 |

(Continued)

*Primary Examiner* — Ricky D Shafer
(74) *Attorney, Agent, or Firm* — Manatt, Phelps & Phillips, LLP

(57) ABSTRACT

Asymmetric sectioned mirrors are presented. The mirrors include, for example, constant radius of curvature sections that are selected to increase the sizes and improve the definitions of images, for example images of children milling, walking and/or standing about either the front or alongside regions of a school bus. The mirrors may be asymmetric in either or both the horizontal and vertical directions. The mirrors may include a mounting system capable of using both ball mounts and tunnel mounts.

18 Claims, 29 Drawing Sheets

(56) References Cited

U.S. PATENT DOCUMENTS

| | | | |
|---|---|---|---|
| 2,857,810 A * | 10/1958 | Troendle | B60R 1/082 359/868 |
| 2,869,425 A | 1/1959 | Kershaw | |
| 3,003,396 A * | 10/1961 | Jenkins | B60R 1/082 359/868 |
| 4,331,382 A * | 5/1982 | Graff | B60R 1/082 359/868 |
| 4,436,372 A | 3/1984 | Schmidt et al. | |
| 4,449,786 A * | 5/1984 | McCord | G02B 5/10 359/868 |
| 4,580,881 A | 4/1986 | Kim | |
| 4,730,914 A | 3/1988 | Stout | |
| 4,730,926 A | 3/1988 | Wedemeyer | |
| 4,822,157 A | 4/1989 | Stout | |
| 4,938,578 A | 7/1990 | Schmidt et al. | |
| 5,005,963 A | 4/1991 | Schmidt et al. | |
| 5,084,785 A | 1/1992 | Albers et al. | |
| D346,357 S | 4/1994 | Englander | |
| 5,307,211 A | 4/1994 | Schmidt et al. | |
| 5,321,556 A | 6/1994 | Joe | |
| 5,589,984 A | 12/1996 | Schmidt et al. | |
| 6,015,215 A | 1/2000 | Herman | |
| 6,069,755 A | 5/2000 | Li | |
| 6,227,674 B1 | 5/2001 | Englander | |
| 6,282,771 B2 * | 9/2001 | Englander | 29/428 |
| 6,328,450 B2 * | 12/2001 | Englander | 359/850 |
| 6,398,377 B1 | 6/2002 | Chou | |
| 6,588,911 B1 | 7/2003 | Martinez | |
| 7,012,761 B1 * | 3/2006 | Schmidt | B60R 1/082 359/708 |
| 7,134,759 B2 | 11/2006 | Schmidt et al. | |
| 7,172,301 B2 | 2/2007 | Ito | |
| 7,234,825 B2 | 6/2007 | Meng | |
| 7,517,100 B2 * | 4/2009 | Englander | B60R 1/08 359/851 |
| 7,780,301 B2 * | 8/2010 | Englander | B60R 1/08 359/851 |
| 8,047,666 B2 * | 11/2011 | Englander | B60R 1/08 359/851 |
| 8,672,494 B2 * | 3/2014 | Englander | B60R 1/00 359/851 |
| 9,302,625 B2 * | 4/2016 | Englander | B60R 1/00 |
| 9,604,575 B2 * | 3/2017 | Englander | B60R 1/08 |
| 9,796,335 B2 * | 10/2017 | Englander | B60R 1/082 |
| 2002/0089753 A1 | 7/2002 | Englander | |
| 2002/0159169 A1 | 10/2002 | McCord | |
| 2003/0169521 A1 | 9/2003 | Hoegh | |
| 2005/0161573 A1 | 7/2005 | Schmidt et al. | |
| 2005/0180034 A1 | 8/2005 | Schmidt et al. | |
| 2006/0023323 A1 | 2/2006 | Meng | |
| 2007/0008635 A1 | 1/2007 | Schmidt et al. | |
| 2007/0030582 A1 | 2/2007 | Schmidt | |
| 2008/0100938 A1 | 5/2008 | Englander et al. | |
| 2009/0015954 A1 | 1/2009 | Englander et al. | |
| 2012/0134036 A1 * | 5/2012 | Englander | B60R 1/082 359/868 |

FOREIGN PATENT DOCUMENTS

| | | | |
|---|---|---|---|
| JP | 08188088 | | 7/1996 |
| JP | 09076821 | * | 3/1997 |

* cited by examiner

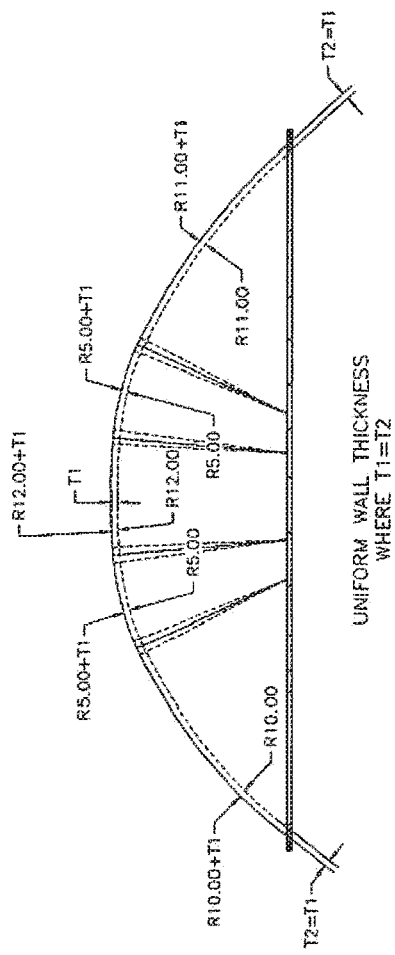
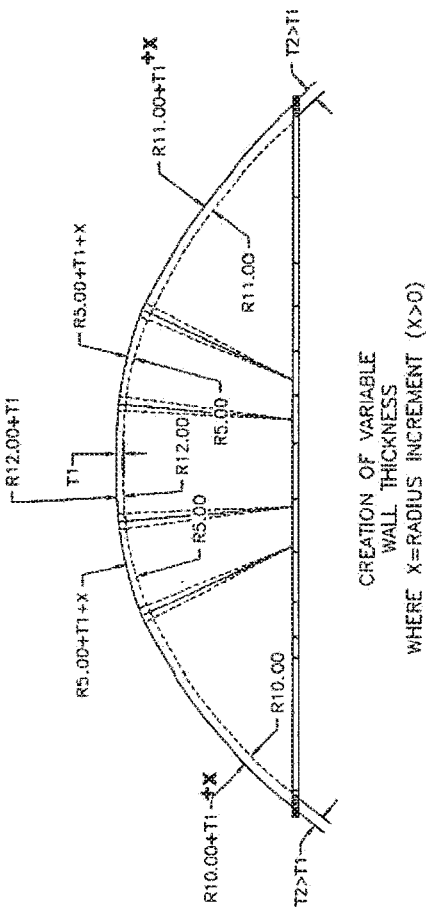

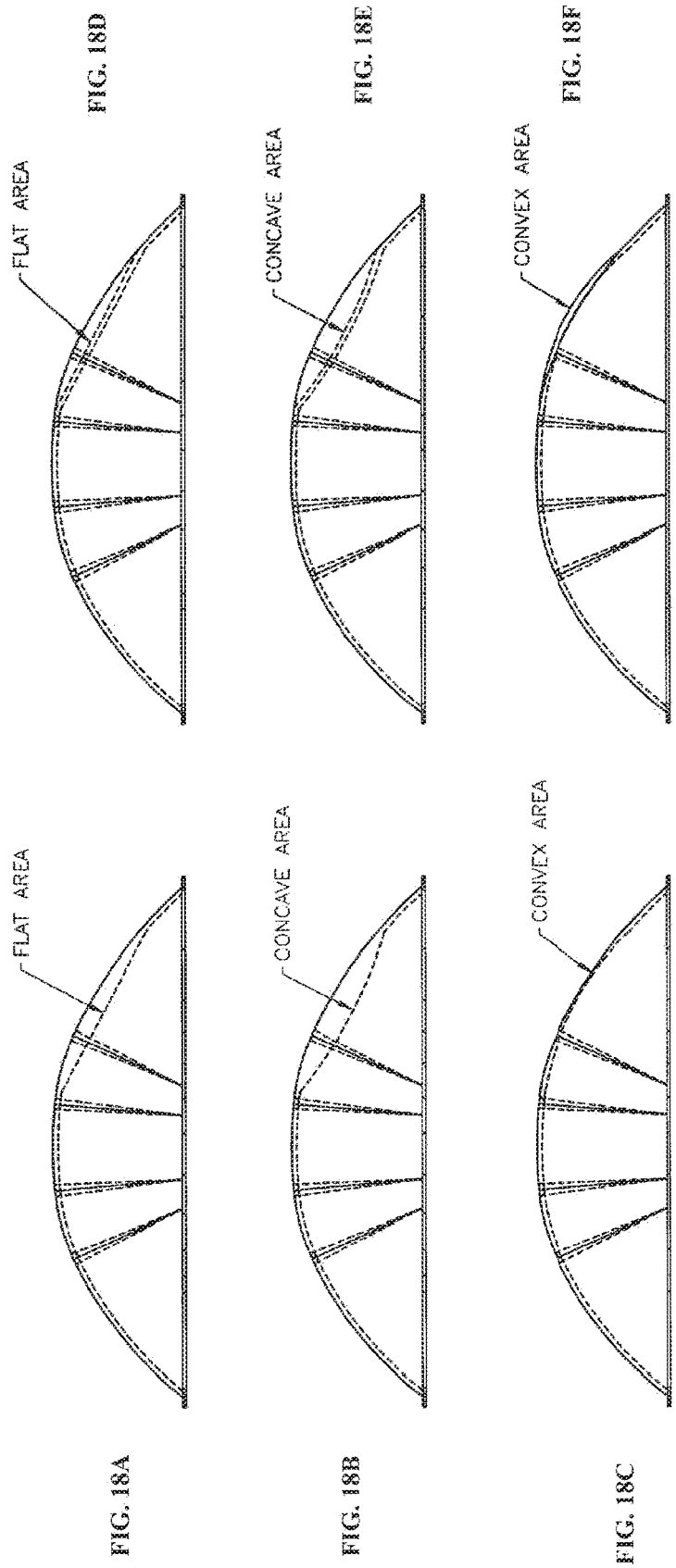

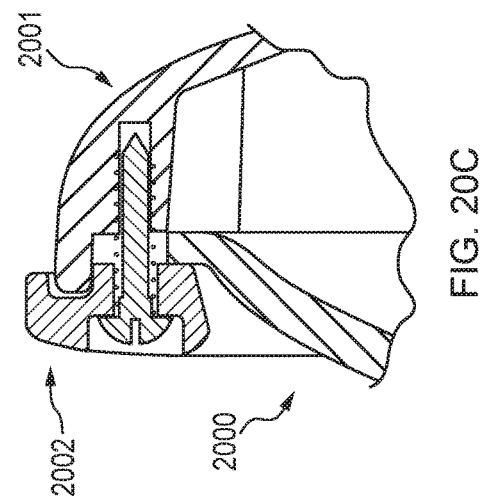
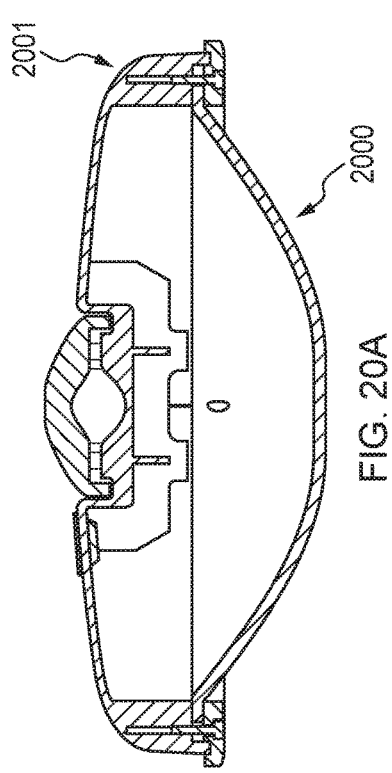
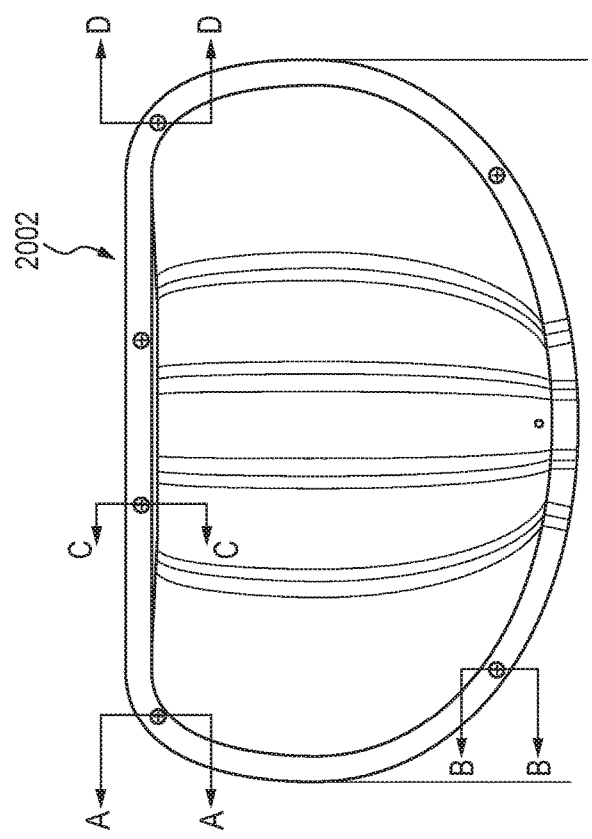

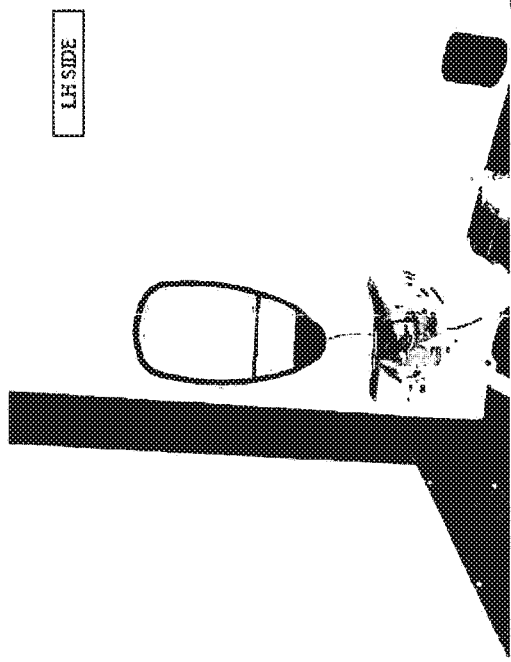
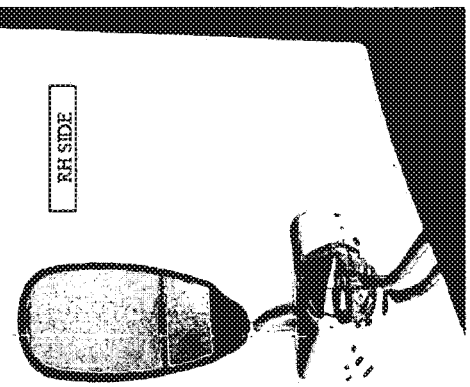
FIG. 26A
FIG. 26B

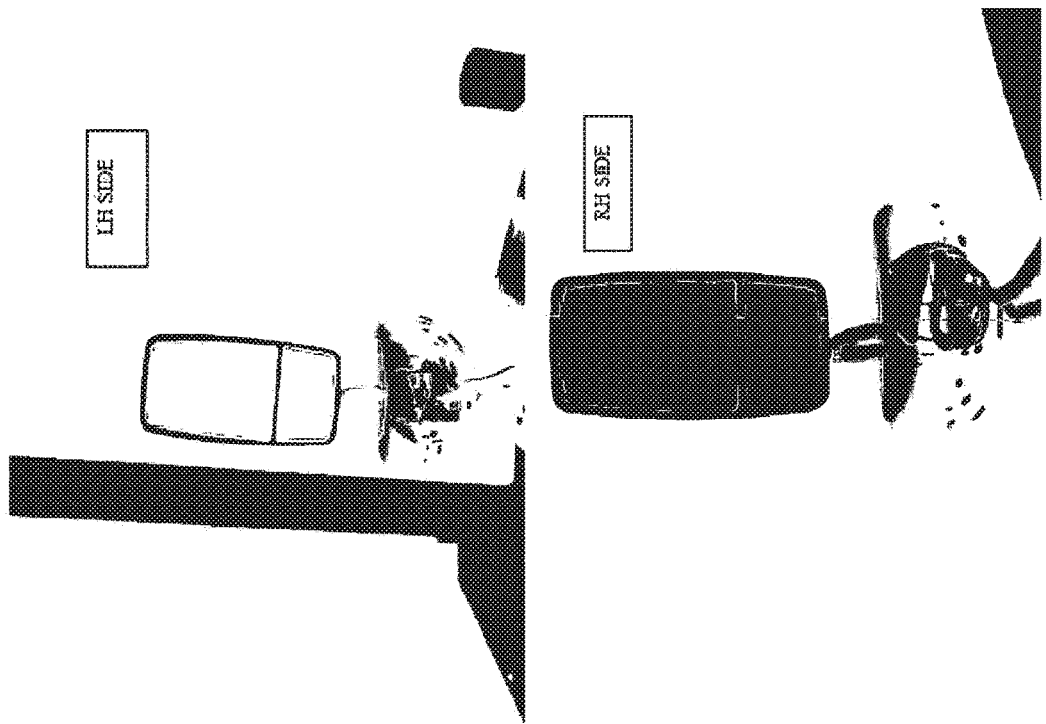

ASYMMETRIC SECTIONED CONVEX MIRRORS

CROSS-REFERENCE TO RELATED APPLICATIONS

This application is a continuation of U.S. patent application Ser. No. 14/218,340 entitled Asymmetric Sectioned Convex Mirrors filed Mar. 18, 2014, now U.S. Pat. No. 9,302,625 issued on Apr. 5, 2016, which is a divisional of U.S. patent application Ser. No. 12/208,914 entitled Asymmetric Sectioned Convex Mirrors filed Sep. 11, 2008, now U.S. Pat. No. 8,672,494 issued on Mar. 18, 2014, which priority to U.S. Provisional Patent Application No. 60/971,334, entitled Asymmetric Mirrors, filed Sep. 11, 2007, incorporated herein by reference in its entirety.

This application is a continuation of U.S. patent application Ser. No. 14/218,340 entitled Asymmetric Sectioned Convex Mirrors filed Mar. 18, 2014, now U.S. Pat. No. 9,302,625 issued on Apr. 5, 2016, which is a continuation in part of, and claims the benefit of an priority to, U.S. patent application Ser. No. 11/619,410, entitled Asymmetric Multiple Constant Radii of Curvature Convex Mirrors, filed Jan. 3, 2007, now U.S. Pat. No. 7,517,100 issued Apr. 14, 2009, which claims benefit of and priority to U.S. Provisional Patent Application No. 60/855,779 entitled Asymmetric Multiple Constant Radii of Curvature Convex Mirrors filed Nov. 1, 2006, the entire contents of which incorporated by reference herein.

BACKGROUND

This disclosure generally relates to convex, three dimensional mirror and, more particularly, to a mirror, sometimes referred to as a "cross-over" or "cross-view" mirror, which affords a bus driver, for example, a school bus driver, visual access in front of, as well as alongside the bus. Such cross-over mirrors can however also be used at the rear or front corners of other vehicles such as with trucks, mail vans and the like. More specifically, the present disclosure relates to non-ellipsoidal, asymmetric cross-view mirrors which are optimized to produce more distinct images of objects located in front of or alongside a school bus or similar vehicle.

For many decades, cross-over mirror and mirror assemblies have been deployed on school buses, and are in fact required by federal and local regulations. A substantial body of prior art has been published describing various mirrors of the type to which the present invention relates. Prior art mirrors include both circular and ellipsoidal mirrors. The prior art ellipsoidal mirror lenses have been characterized by radii of curvature (measured along planar cross-sections on the major and minor axes) which were distinctly non-constant, i.e., tending to increase or decrease on the minor lens toward or adjacent its peripheral, circumferential edge. The variation in the radius of curvature is used to obtain larger and less distorted images at the mirror center, and smaller, but more distorted, images, at the peripheral regions on the mirror This in essence, would increase the field of view that the mirror monitors in and around the school bus.

However, it has been determined that the size and general shape of the monitored area in front of a school bus differs from that which needs to be monitored alongside the bus. That is, school buses and similar vehicles have comparative lengths several times larger than the widths of the vehicles. The image of a child standing alongside a school bus near the rear wheels needs to be sufficiently large to afford the driver a good view of a child who may stoop low or fallen or slipped under or too close to the school bus. At the front of the bus, it has been determined, is more important to assure that the entire width and several feet in front of the bus are clearly visible. In other words, the field of view characteristics in front of the school bus and alongside differ from one another. Prior art mirrors have not been optimized to fully accommodate these differences.

Rather, all prior art mirrors, including those that have horizontally stretched bodies, are widthwise symmetrical with respect to their generally vertical mounting axis. Thus, the mirror surface size and shape and field of view to the right of the axis is identical to the mirror surface and view to the left of the axis. Therefore, both sides of the lens provide the same image reflecting characteristics at the left mirror side, which is primarily focused on the area in front of the bus, as at the right mirror side which focuses images from alongside the bus (for a mirror mounted to the right of the driver).

In addition, prior art mirrors that have varying radii of curvature over the entire mirror surface or substantial part thereof result in continually changing image sizes, along the surfaces of the mirror. This can make it more difficult for the driver to follow and carefully monitor the movements of a child alongside or in front of the school bus.

BRIEF SUMMARY

It is a feature and benefit of the present invention, in accordance with some embodiments, to overcome the aforementioned drawbacks of the prior art and to provide a mirror, such as a cross-view mirror, which generally increases the size and improves the definitions of images of children milling, standing, and/or walking about either the front or alongside regions of the school bus. The features of the mirror or mirrors described below are not required, but are rather characteristics that may be part of the mirror, the exact features and combination of elements being defined by the claims and not by this section of the disclosure.

Under one aspect and/or alternative embodiment of the invention an asymmetric mirror includes multiple sections, such as a first, second, and third sections extending width wise along the mirror. The first, second, and third sections are optionally each of a different constant radius of curvature. The center section has, for example, the largest radius of curvature. In alternative embodiments, the center section has a smaller radius of curvature at least with respect to another section. In alternate embodiments, no specific center section is provided, but sections that are not located at the center are utilized.

Under another aspect and/or alternative embodiment of the invention, the constant radius of curvature sections are joined by variable radius of curvature sections. Under another aspect and/or alternative embodiment of the invention, only first and second sections extending width-wise along the mirror are provided. The alternative embodiments of the invention, the sections may have increasing and/or decreasing varying radii of curvature.

Under another aspect and/or alternative embodiment of the invention an asymmetric mirror includes a first, second, and third sections extending height-wise along the mirror. The first, second, and third sections are optionally each of a different constant radius of curvature. The center section has the largest radius of curvature. The mirror includes first, second, and third height-wise extending sections, each respectively having a different, constant radius of curvature.

Under another aspect and/or alternative embodiment of the invention, the constant radius of curvature height wise sections are joined by variable radius of curvature height wise sections. Under another aspect and/or alternative embodiment of the invention, only first and second sections extending height-wise along the mirror are provided. In alternative embodiments of the invention, the sections may have increasing and/or decreasing varying radii of curvature.

Under another aspect of the invention, the mirror lens is thinner in the center and thicker near the edge. In another alternative embodiment of the invention, the mirror lens is thicker in the center and thinner near the edge and/or has varying thickness to provide the desired effect.

Under another aspect and/or alternative embodiment of the invention an asymmetric mirror includes a first, second, and third sections extending width wise along the mirror. The first and second sections have the same radius of curvature. The third section has a different, larger, constant radius of curvature. The mirror includes at least one height-wise extending section, such as first, second, and third height-wise extending sections, each respectively having a different, constant radius of curvature. In alternative embodiments of the invention, any type of mirror can be made in accordance with the present invention, including, for example, a variety of vehicle mirrors such as rear view mirror; mirrors inside the vehicle, and/or any mirror used outside the vehicle. In addition, in alternative embodiments, the mirror lens of the present invention can be used in buildings, outside of buildings and in other settings that benefit from the view attainable by the mirror lens, mounting mechanism and/or manufacturing process of the present invention.

Under another aspect and/or alternative embodiment of the invention the mirror includes a mirror back for supporting the mirror lens and a mirror mount capable of accepting a plurality of mounting mechanisms.

BRIEF DESCRIPTION OF THE DRAWINGS

For a more complete understanding of various embodiments of the present invention, reference is now made to the following descriptions taken in connection with the accompanying drawings in which:

FIGS. 3A and 3B illustrate a cross section view of an asymmetric constant thickness mirror lens and an asymmetric variable thickness minor lens in accordance with one or more embodiments of the invention.

FIGS. 16 through 17 and 18A through 18F are illustrations of localized flattening or bowing of the outer surface of asymmetric, sectioned mirrors.

FIGS. 20A, 20B, and 20C illustrate a multiview orthographic projection of a mirror lens, mirror rim, and mirror housing in accordance with one or more embodiments of the invention.

FIGS. 23A through 23C, 24A through 24C, 25A through 25B, 26A through 26B, 27A through 27B, and 28A through 28B are views of a rear view mirror assembly mounted on a vehicle in accordance with one or more embodiments of the invention.

DETAILED DESCRIPTION

Figure 1:
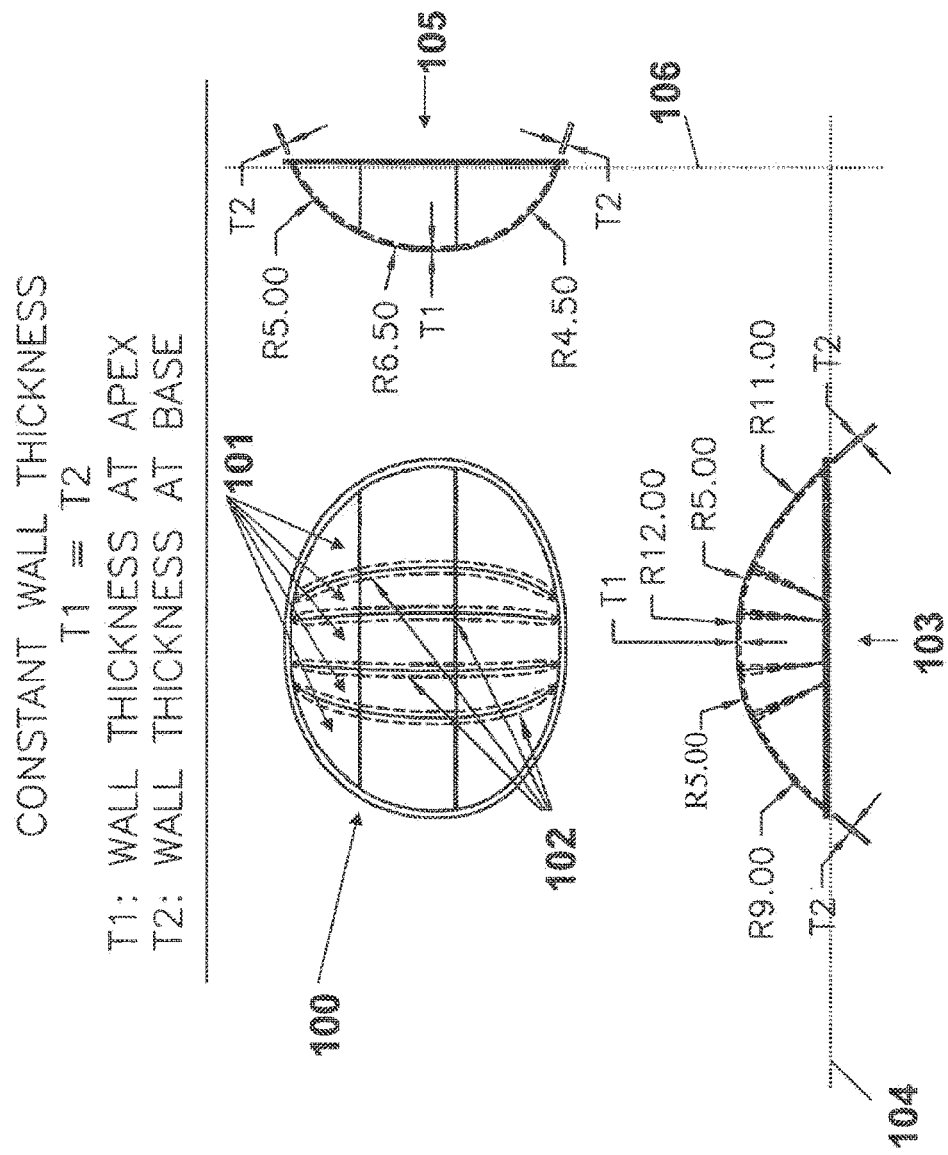
FIG. 1 is a multiview orthographic projection of an asymmetric, sectioned, constant thickness mirror lens in accordance with one or more embodiments of the invention.

Before explaining at least one embodiment of the invention in detail it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Mirror Dimensions

FIG. 1 is a multiview orthographic projection of a mirror lens 100. The mirror lens 100 includes a plurality of constant Radius of Curvature ("ROC") surfaces 101 tailored to the viewing requirements of various areas around the school bus. The constant ROC surfaces 101 are joined by a plurality of blending zones 102. The blending zones 102 create a smooth visual transition between the constant ROC surfaces 101.

All mirrors are manufactured within some acceptable manufacturing tolerances. These include a tolerance on how constant the radius is across each individual ROC section, as well as a tolerance on how close the actual ROC is to the target ROC for each individual ROC section. For example, deviations measured with a Coordinate Measuring Machine, on the order of plus or minus approximately 30-thousandths (0.030) of an inch for the radii of curvature in an individual constant ROC surface are acceptable for the purpose of this invention. In other words, if a minor surface is tested and found to have a curvature that is consistent within 30-thousandths of an inch, the mirror surface should be considered to have constant curvature, and not varying curvature. In addition, the ROC of an individual constant ROC surface, while constant, may deviate from the target ROC due to the manufacturing process. For example, a deviation on the order of plus or minus one half inch with respect to the target value may occur in the magnitude of an individual constant ROC surface.

The x-axis cross-section view 103 shows that the mirror lens 100 can be asymmetric along the x-axis 104. In addition, the x-axis cross-section view 103 shows that the ROC at the center of the mirror is larger than the ROC at the edge of the minor. Moving from left to right along the x-axis 104, also referred to as the horizontal axis, the constant ROC surfaces measure 9.0, 5.0, 12.0, 5.0, and 11.0 inches, respectively. As noted above, the constant ROC surfaces 101 are tailored to the viewing requirements of various areas around the school bus. For example, the two 5.0 constant ROC surfaces 101, on either side of the 12.0 constant ROC surface 101, allow for an expanded viewing area when compared to a mirror containing just a 12.0 constant ROC surface.

The x-axis cross-section view 103 also shows the blending zones 102. There is a blending zone 102 between the 9.0 and 5.0 constant ROC surfaces 101. Similarly, there is a blending zone 102 between the 5.0 and 12.0, the 12.0 and 5.0, and the 5.0 and 11.0 constant ROC surfaces 101.

The y-axis cross-section view 105 shows that the mirror lens 100 can be asymmetric along the y-axis 106. In addition, the y-axis cross-section view 105 shows that the ROC at the center of the mirror is larger than the ROC at the edge of the mirror. Moving from bottom to top along the y-axis 106, also referred to as the vertical axis, the constant ROC surfaces measure 4.5, 6.5 and 5.0 inches, respectively.

The x-axis cross-section view 103 and the y-axis cross-section view 105 also show the thickness of the mirror lens 100. The thickness at the center (apex) of the lens T1 is the same as the thickness at the peritnetral edge (base) T2. This is referred to as a constant wall thickness mirror lens.

Figure 2:
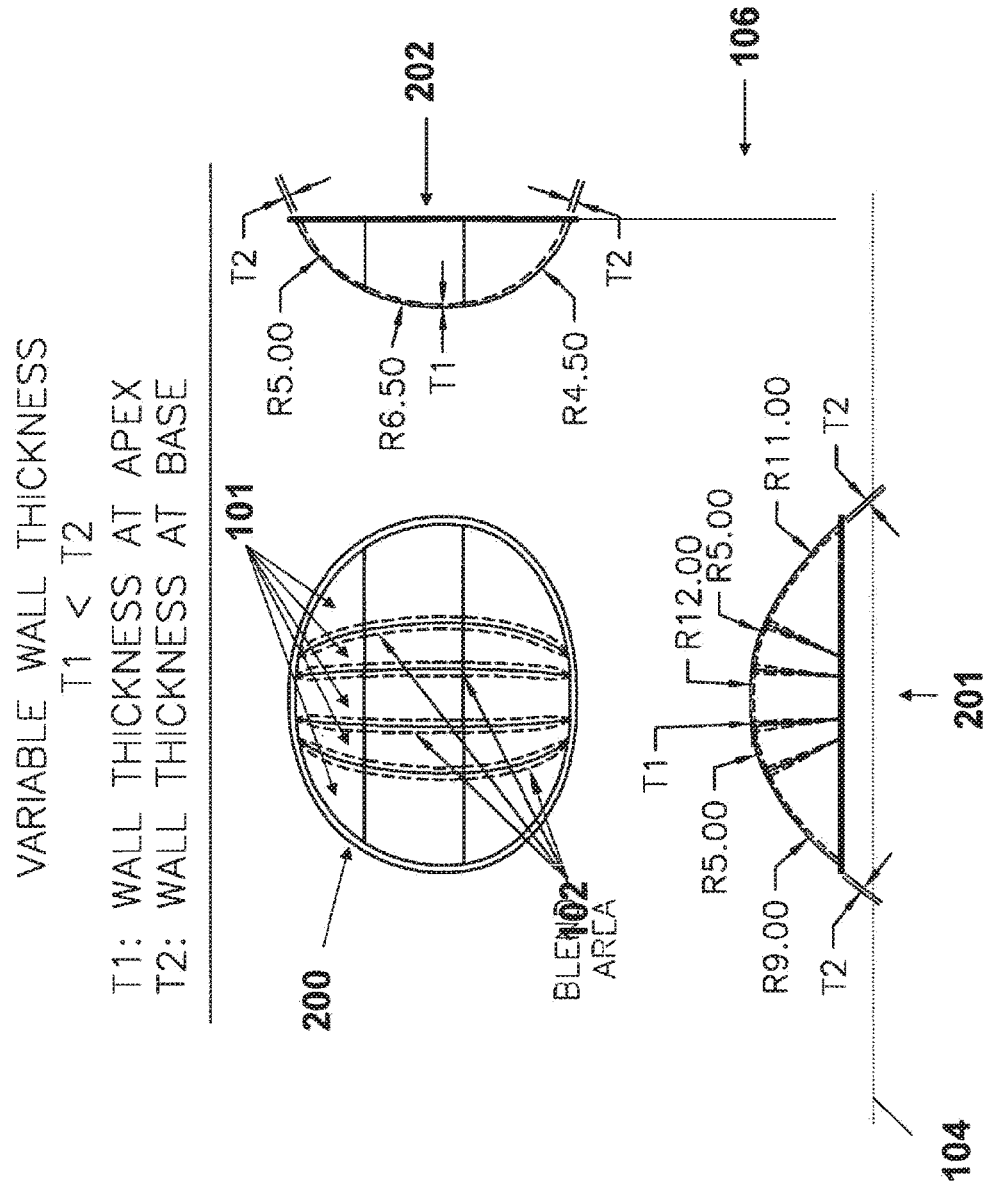
FIG. 2 is a multiview orthographic projection of an asymmetric, sectioned, variable thickness mirror lens in accordance with one or more embodiments of the invention.

FIG. 2 is a multiview orthographic projection of a minor lens 200. The mirror lens 200 includes a plurality of constant Radius of Curvature ("ROC") surfaces 101 tailored to the viewing requirements of various areas around the school bus. The constant ROC surfaces 101 are joined by a plurality of blending zones 102. The blending zones 102 create a smooth visual transition between the constant ROC surfaces 101.

The x-axis cross-section view 201 shows that the mirror lens 200 can be asymmetric along the x-axis 104. In addition, the x-axis cross-section view 201 shows that the ROC at the center of the mirror is larger than the ROC at the edge of the mirror. Moving from left to right along the x-axis 104, also referred to as the horizontal axis, the constant ROC surfaces measure 9.0, 5.0, 12.0, 5.0) and 11.0 inches) respectively. As noted above, the constant ROC surfaces 101 are tailored to the viewing requirements of various areas around the school bus. For example, the two 5.0 constant ROC surfaces 101, on either side of the 12.0 constant ROC surface 101, allow for an expanded viewing area when compared to a mirror containing just a 12.0 constant ROC surface.

The x-axis cross-section view 201 also shows the blending zones 102. There is a blending zone 102 between the 9.0 and 5.0 constant ROC surfaces 101. Similarly, there is a blending zone 102 between the 5.0 and 12.0, the 12.0 and 5.0, and the 5.0 and 11.0 constant ROC surfaces 101.

The y-axis cross-section view 202 shows that the mirror lens 200 can be asymmetric along the y-axis 106. In addition, the y-axis cross-section view 202 shows that the ROC at the center of the mirror is larger than the ROC at the edge of the mirror. Moving from bottom to top along the y-axis 106, also referred to as the vertical axis, the constant ROC surfaces measure 4.5, 6.5 and 5.0 inches, respectively.

The x-axis cross-section view 201 and they-axis cross-section view 202 also show the thickness of the mirror lens 200. Unlike mirror lens 100, the thickness at the center (apex) of the lens T1 is not the same as the thickness at the perimetral edge (base) T2. The outer surface of the mirror lens can be adjusted to create a varying lens thickness that increases from the center of the lens (T1) to the perimetral edge of the lens (T2). This is referred to as a variable wall thickness mirror lens.

FIGS. 3A and 3B show an x-axis cross section view 301 of a constant thickness mirror lens and an x-axis cross section view 302 view of a variable wall thickness mirror lens. Cross section view 302 shows a 12.0 inch ROC in the center section of the mirror lens, along with a center section lens thickness denoted as T1. This gives a 12.0+X inch ROC for the outer surface of the center section of the mirror lens. Cross section view 302 shows the two sections of the mirror lens adjacent to the center section having a 5.0 inch ROC. However, the thickness of the mirror lens for these sections is T1+X, where X is defined as the incremental radius and has a value greater than zero. This gives a 5.0+T1+X inch ROC for the outer surface of these sections of the mirror lens.

The variable wall thickness of the mirror lens is a result of adding the incremental radius X to portions of the mirror lens. This, as noted above, results in a greater thickness (T2) at the perimetral edge. In addition, the variable wall thickness results in the inner and outer surfaces of the lens no longer being parallel. Snell's law states that the non-parallel inner and outer surfaces create a slight doubling (refraction) of the image, that will still overlap the original image. This gives the appearance that resulting image is wider than the original image. This can, for example, make the images of children in front of a bus larger and more easily recognized. This can also make the image width better for FMVS I11 and CMVS 111, incorporated herein by reference. Both standards have image width requirements for images seen near the edge of the field of view.

In an alternative embodiment of the invention, the mirror lens is thicker in the center and thinner near the edge. The choice of mirror thickness is a design choice used to provide the desired image effect in the region of interest for the particular mirror application.

Figure 4:
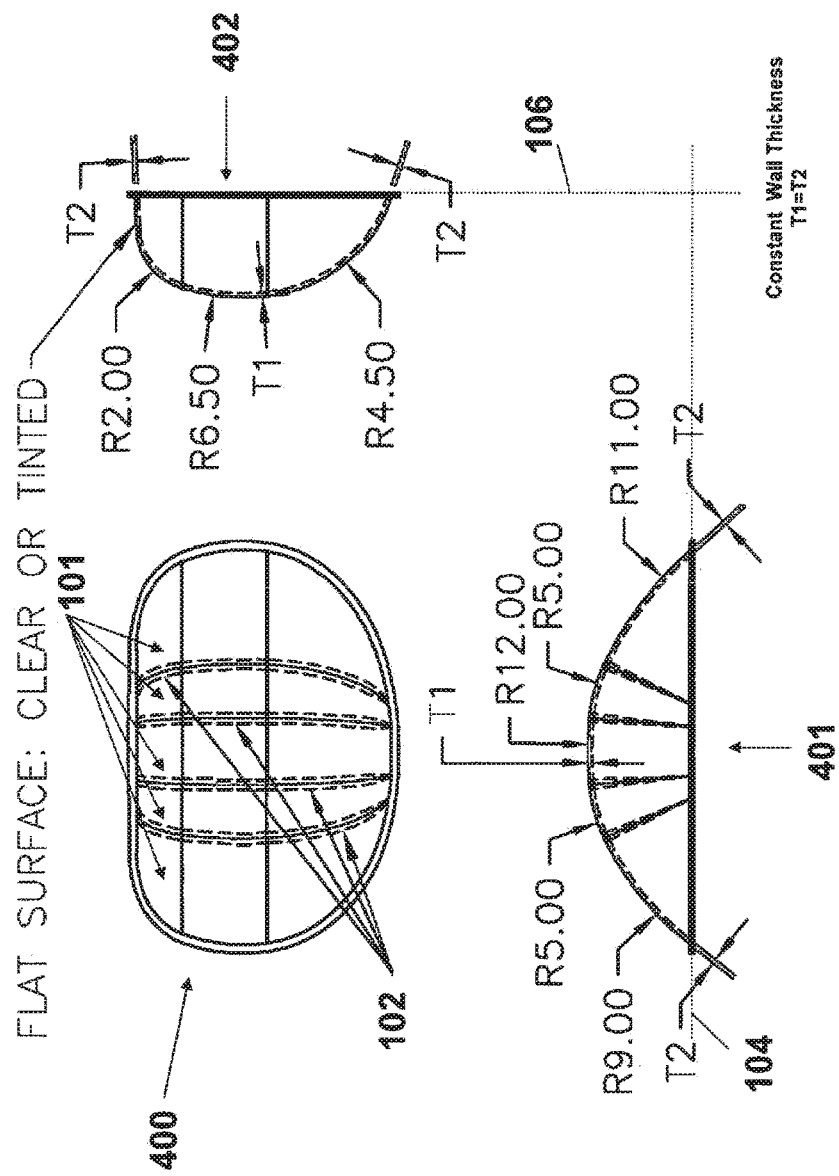
FIG. 4 is multiview orthographic projection of an asymmetric, sectioned, constant thickness mirror lens with a flattened top in accordance with one or more embodiments of the invention.

FIG. 4 is a multiview orthographic projection of a mirror lens 400. The mirror lens 400 includes a plurality of constant Radius of Curvature ("ROC") surfaces 101 tailored to the viewing requirements of various areas around the school bus. The constant ROC surfaces 101 are joined by a plurality of blending zones 102. The blending zones 102 create a smooth visual transition between the constant ROC surfaces 101.

The x-axis cross-section view 401 shows that the mirror lens 400 can be asymmetric along the x-axis 104. In addition the x-axis cross-section view 401 shows that the ROC at the center of the mirror is larger than the ROC at the edge of the mirror. Moving from left to right along the x-axis 104, also referred to as the horizontal axis the constant ROC surfaces measure 9.0, 5.0, 12.0, 5.0, and 11.0 inches, respectively. As noted above, the constant ROC surfaces 101 are tailored to the viewing requirements of various areas around the school bus. For example, the two 5.0 constant ROC surface 101, on either side of the 12.0 constant ROC surface 101, allow for an expanded viewing area when compared to a mirror containing just a 12.0 constant ROC surface.

The x-axis cross-section view 401 also shows the blending zones 102. There is a blending zone 102 between the 9.0 and 5.0 constant ROC surfaces 101. Similarly, there is a blending zone 102 between the 5.0 and 12.0, the 12.0 and 5.0, and the 5.0 and 11.0 constant ROC surfaces 101.

The y-axis cross-section view 402 shows that the mirror lens 400 can be asymmetric along the y-axis 106. In addition, the y-axis cross-section view 402 shows that the ROC at the center of the mirror is larger than the ROC at the edge of the mirror. Moving from bottom to top along the y-axis 106, also referred to as the vertical axis, the constant ROC surfaces measure 4.5, 6.5 and 2.0 inches, respectively.

The x-axis cross-section view 401 and the y-axis cross-section view 402 show that mirror lens 400 is a constant wall thickness mirror lens.

Unlike mirror lens 100 of FIG. 1, the top of mirror lens 400 is flattened. One advantage of this shape is that it reduces the size, or footprint, of the mirror without reducing the field of view of the mirror. The decreased footprint of the mirror reduces the size of the forward looking blind spot of the mirror in front of the vehicle. In addition, the mirror's aerodynamic performance is improved while reducing the mirror weight and cost of mounting the mirror to the vehicle. In the alternative, the footprint of the mirror may be maintained while obtaining the benefit of increased image sizes.

Figure 5:
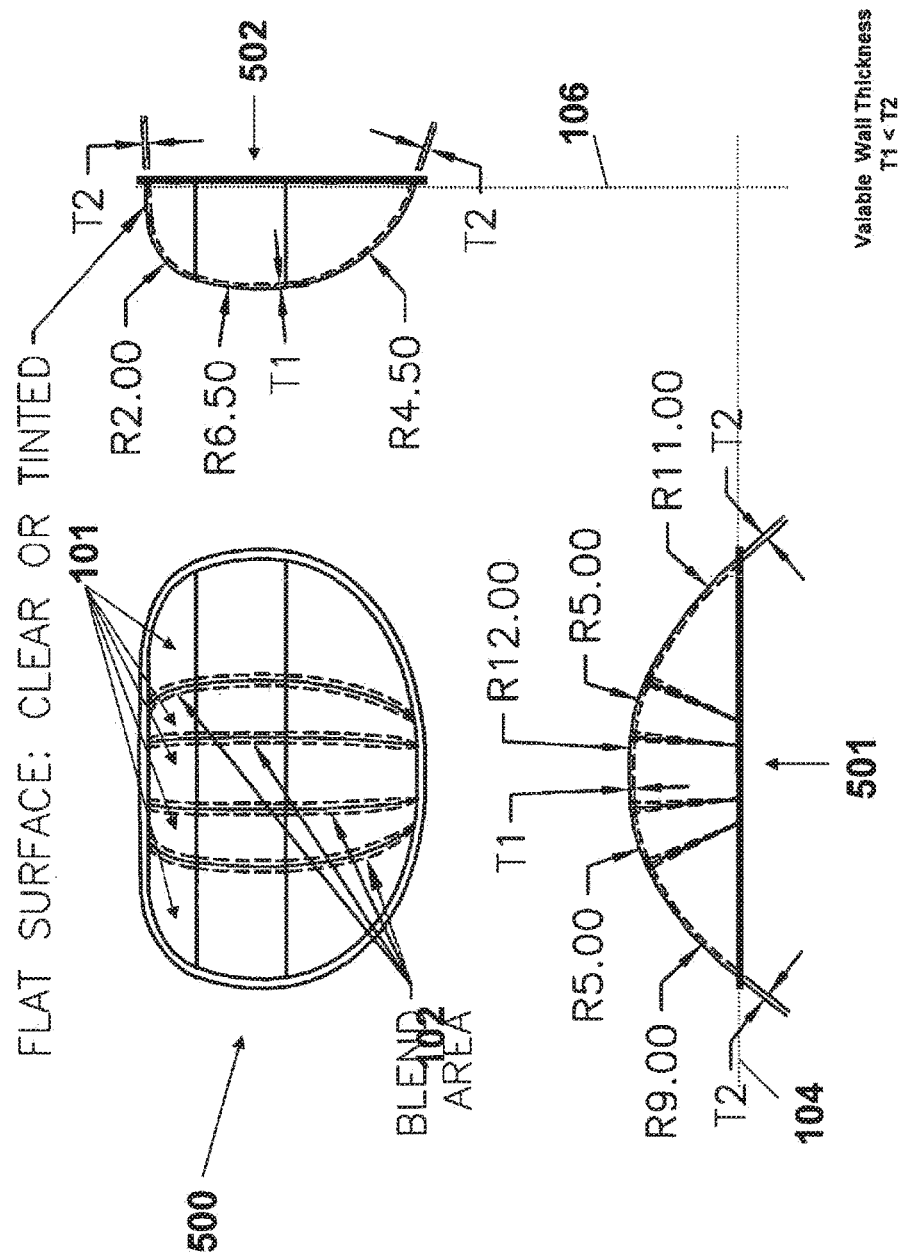
FIG. 5 is a multiview orthographic projection of an asymmetric, sectioned, variable thickness mirror lens with a flattened top in accordance with one or more embodiments of the invention.

FIG. 5 is a multiview orthographic projection of a mirror lens 500. The mirror lens 500 includes a plurality of constant Radius of Curvature ("ROC") surfaces 101 tailored to the viewing requirements of various areas around the school bus. The constant ROC surfaces 101 are joined by a plurality of blending zones 102. The blending zones 102 create a smooth visual transition between the constant ROC surfaces 101.

The x-axis cross-section view 501 shows that the mirror lens 500 can be asymmetric along the x-axis 104. In addition, the x-axis cross-section view 501 shows that the ROC at the center of the mirror is larger than the ROC at the edge of the mirror. Moving from left to right along the x-axis 104, also referred to as the horizontal axis the constant ROC surfaces measure 9.0, 5.0, 12.0, 5.0, and 11.0 inches, respectively. As noted above, the constant ROC surfaces 101 are tailored to the viewing requirements of various areas around the school bus. For example, the two 5.0 constant ROC surfaces 101, on either side of the 12.0 constant ROC surface 101, allow for an expanded viewing area when compared to a mirror containing just a 12.0 constant ROC surface.

The x-axis cross-section view 501 also shows the blending zones 102. There is a blending zone 102 between the 9.0 and 5.0 constant ROC surfaces 101. Similarly, there is a blending zone 102 between the 5.0 and 12.0, the 12.0 and 5.0, and the 5.0 and 11.0 constant ROC surfaces 101.

The y-axis cross-section view 502 shows that the mirror lens 500 can be asymmetric along the y-axis 106. In addition, the y-axis cross-section view 502 shows that the ROC at the center of the mirror is larger than the ROC at the edge of the mirror. Moving from bottom to top along the y-axis 106, also referred to as the vertical axis, the constant ROC surfaces measure 4.5, 6.5 and 2.0 inches, respectively.

The x-axis cross-section view 501 and the y-axis cross-section view 502 show that mirror lens 500 is a variable wall thickness mirror lens. The advantages of a variable wall thickness mirror lens are discussed above with respect to FIG. 2.

Unlike mirror lens 100 of FIG. 1, the top of mirror lens 500 is flattened. The advantages of this flattened shape are discussed above with respect to FIG. 4.

Figure 6:
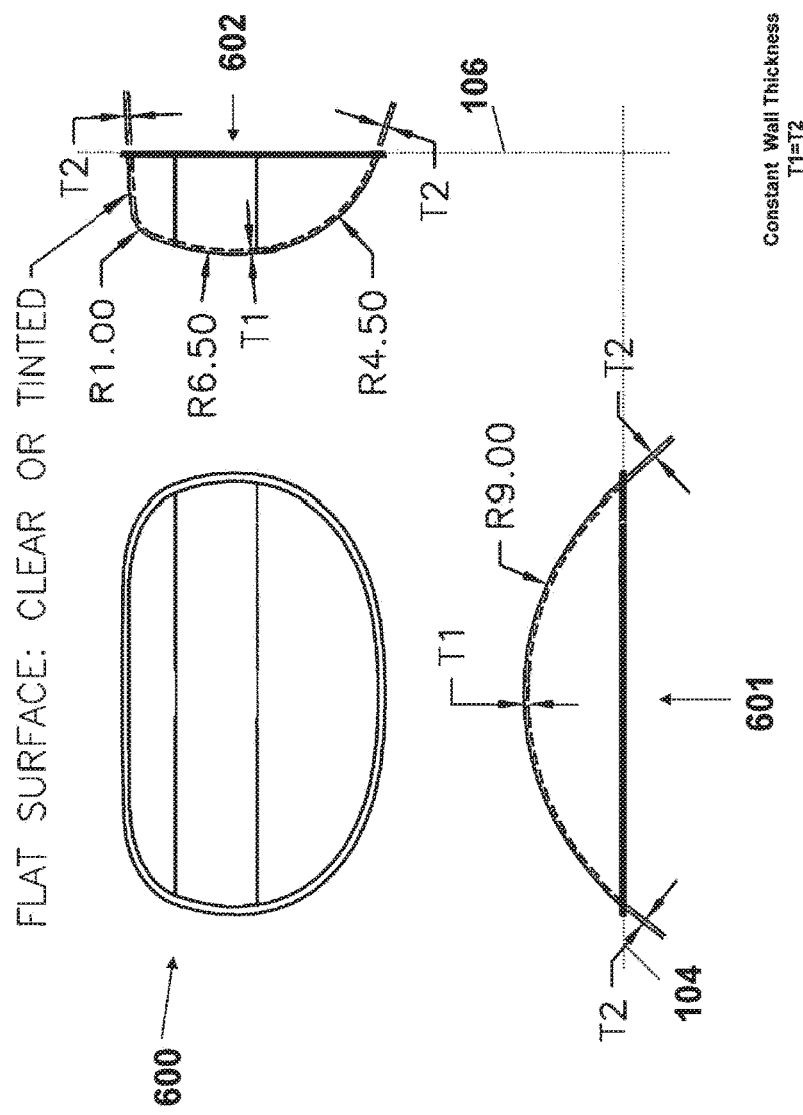
FIG. 6 is a multiview orthographic projection of a vertically asymmetric sectioned, constant thickness mirror lens with a flattened top in accordance with one or more embodiments of the invention.

FIG. 6 is a multiview orthographic projection of a mirror lens 600.

Unlike the mirror lens 100 of FIG. 1, the x-axis cross-section view 601 shows that the mirror lens 600 is symmetric along the x-axis 104. Mirror lens 600 has constant ROC surface measuring 9.0 inches along the x-axis.

The y-axis cross-section view 602 shows that the mirror lens 600 can be asymmetric along the y-axis 106. In addition, the y-axis cross-section view 602 shows that the ROC at the center of the mirror is larger than the ROC at the edge of the mirror. Moving from bottom to top along the y-axis 106, also referred to as the vertical axis, the constant ROC surfaces measure 4.5) 6.5 and 1.0 inches, respectively.

The x-axis cross-section view 601 and the y-axis cross-section view 602 show that mirror lens 600 is a constant wall thickness mirror lens.

Unlike mirror lens 100 of FIG. 1, the top of mirror lens 600 is flattened. The advantages of this flattened shape are discussed above with respect to FIG. 4.

Figure 7:
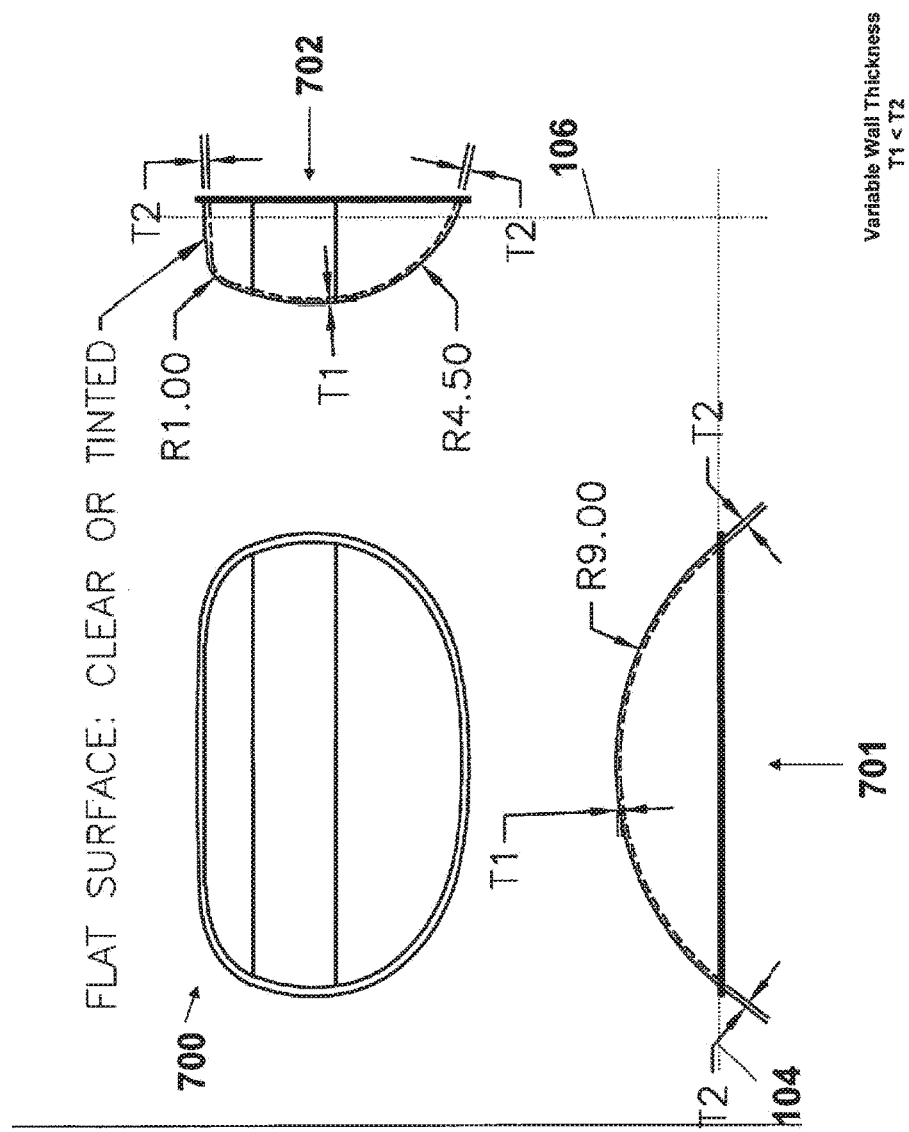
FIG. 7 is a multiview orthographic projection of a vertically asymmetric, sectioned, variable thickness mirror lens with a flattened top in accordance with one or more embodiments of the invention.

FIG. 7 is a multiview orthographic projection of a mirror lens 700.

Unlike the mirror lens 100 of FIG. 1, the x-axis cross-section view 701 shows that the mirror lens 700 is asymmetric along the x-axis 104. Mirror lens 700 has constant ROC surface measuring 9.0 inches along the x-axis.

The y-axis cross-section view 702 shows that the mirror lens 700 can be asymmetric along the y-axis 106. In addition, the y-axis cross-section view 702 shows that the ROC at the center of the mirror is larger than the ROC at the edge of the mirror. Moving from bottom to top along the y-axis 106, also referred to as the vertical axis, the constant ROC surfaces measure 4.5, 6.5 and 1.0 inches, respectively.

The x-axis cross-section view 701 and the y-axis cross-section view 702 shows that mirror lens 700 is a variable wall thickness mirror lens. The advantages of a variable wall thickness mirror lens are discussed above with respect to FIG. 2.

Unlike mirror lens 100 of FIG. 1, the top of mirror lens 700 is flattened. The advantages of this flattened shape are discussed above with respect to FIG. 4.

Figure 8:
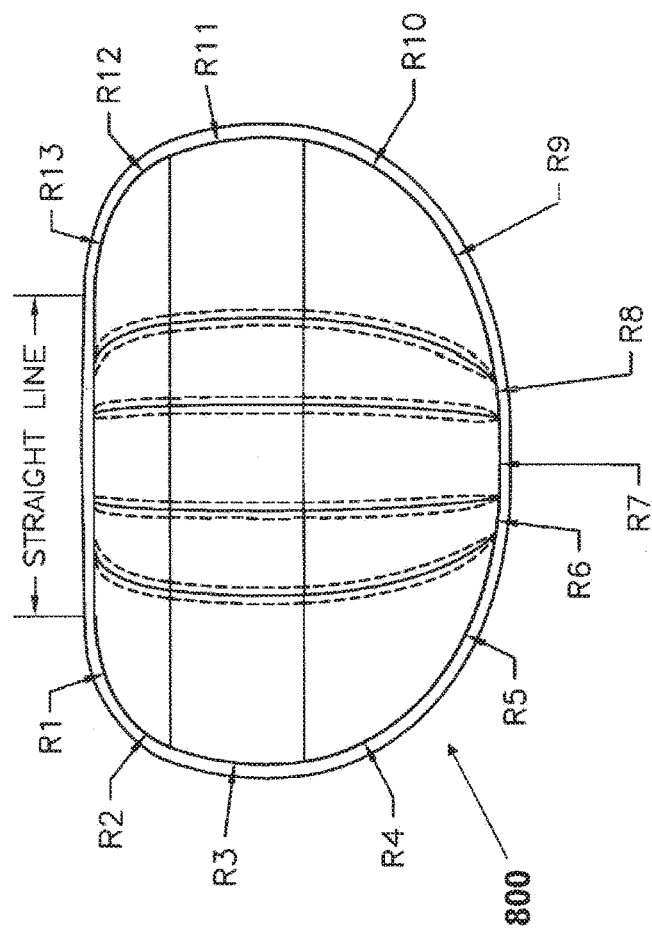
FIG. 8 is a plan view showing the radii of curvature along the base of an asymmetric mirror in accordance with one or more embodiments of the invention.

FIG. 8 is a plan view of mirror lens 800. This shows that the perimetral edge of the mirror can include as many as 13 or more distinct ROC's.

Figure 9:
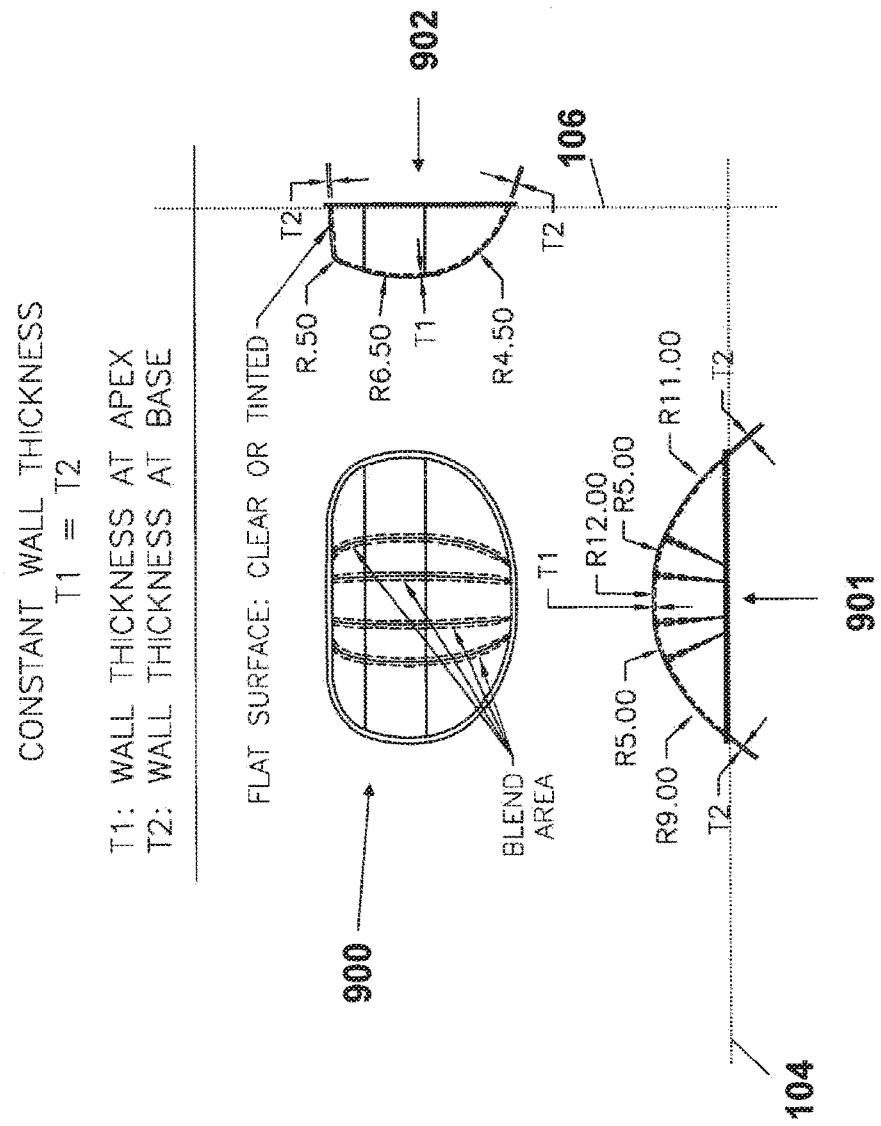
FIGS. 9-14 are multiview orthographic projections of asymmetric, sectioned mirrors that are variations of FIGS. 4 and 5.
Figure 10:
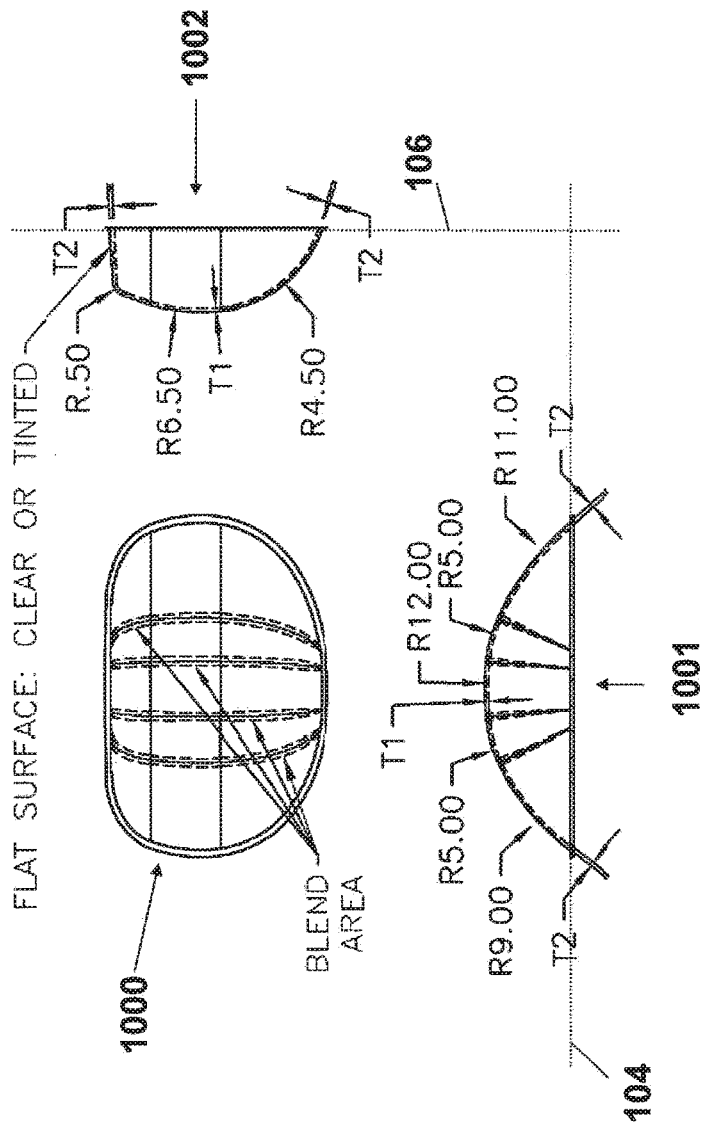

FIGS. 9 and 10 illustrate variations of FIGS. 4 and 5 where there is a more abrupt transition from vertical to horizontal at the top of the mirror.

FIG. 9 is a multiview orthographic projection of a mirror lens 900. The mirror lens 900 is similar to the mirror lens 400 of FIG. 4. The x-axis cross-section view 901 shows that the mirror lens 900 can be asymmetric along the x-axis 104. Moving from left to right along the x-axis 104, also referred to as the horizontal axis, the constant ROC surfaces measure 9.0, 5.0, 12.0, 5.0, and 11.0 inches, respectively. The y-axis cross-section view 902 shows that the mirror lens 900 can be asymmetric along the y-axis 106. Moving from bottom to top along the y-axis 106, also referred to as the vertical axis, the constant ROC surfaces measure 4.5, 6.5 and 0.5 inches, respectively. The x-axis cross-section view 901 and the y-axis cross-section view 902 show that mirror lens 900 is a constant wall thickness mirror lens.

FIG. 10 is a multiview orthographic projection of a mirror lens 1000. The mirror lens 1000 is similar to the mirror lens 500 of FIG. 5. The x-axis cross-section view 1001 shows that the mirror lens 1000 can be asymmetric along the x-axis 104. Moving from left to right along the x-axis 104, also referred to as the horizontal axis the constant ROC surfaces measure 9.0, 5.0, 12.0, 5.0, and 11.0 inches, respectively. The y-axis cross-section view 1002 shows that the mirror lens 1000 can be asymmetric along the y-axis 106. Moving from bottom to top along the y-axis 106, also referred to as the vertical axis, the constant ROC surfaces measure 4.5, 6.5 and 0.5 inches, respectively. The x-axis cross-section view 1001 and the y-axis cross-section view 1002 show that mirror lens 1000 is a variable wall thickness mirror lens. The advantages of a variable wall thickness mirror or lens are discussed above with respect to FIG. 2.

Figure 11:
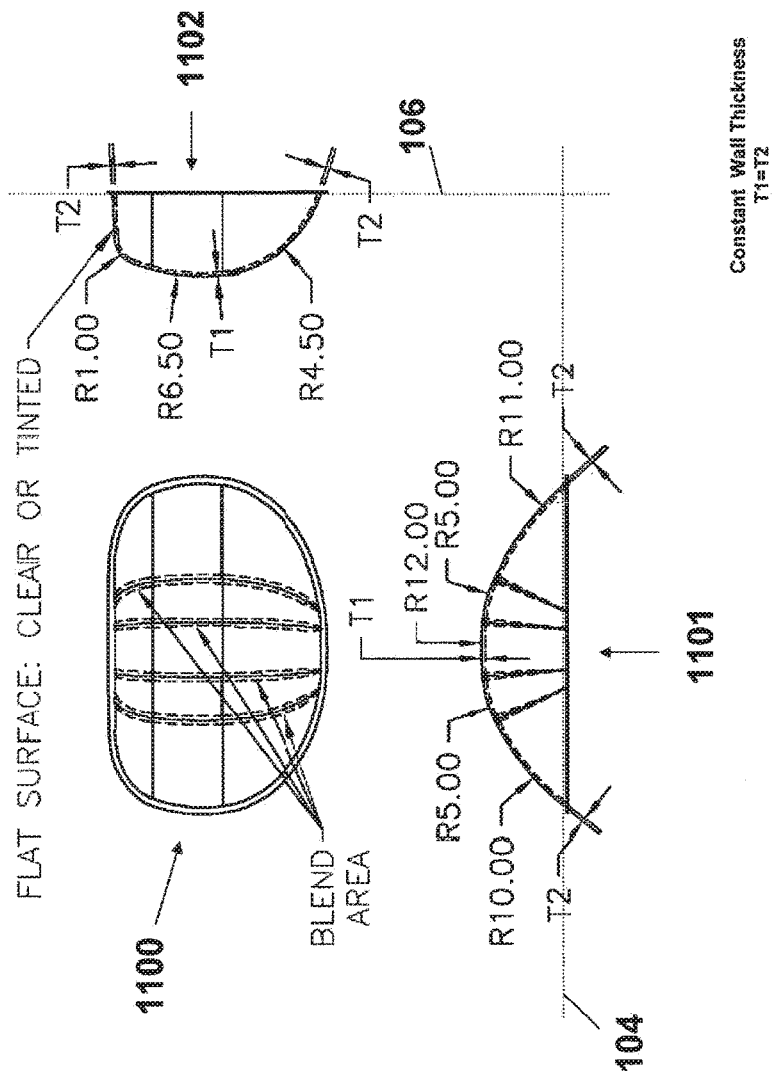
Figure 12:
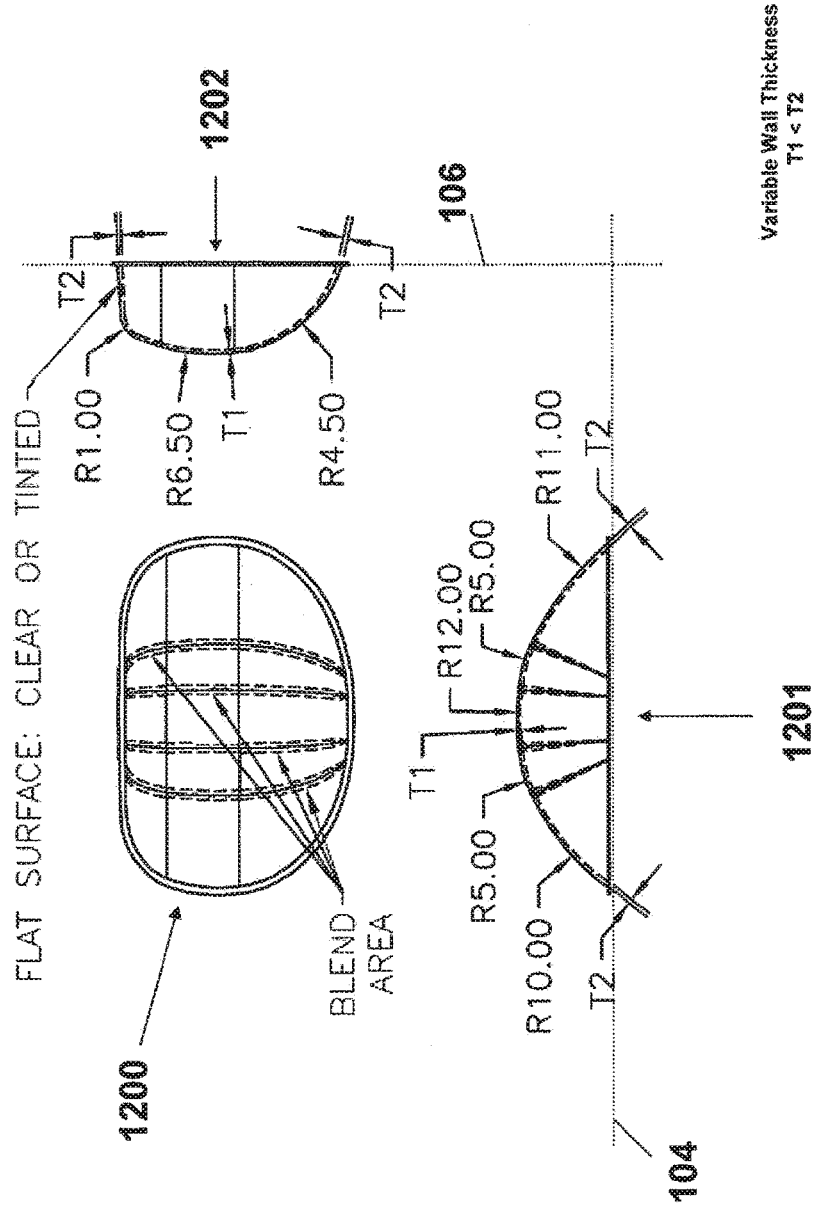

FIGS. 11 and 12 illustrate additional variations of FIGS. 4 and 5 where the asymmetry along the x-axis has been reduced and there is a more abrupt transition from vertical to horizontal at the top of the mirror.

FIG. 11 is a multiview orthographic projection of a mirror lens 1100. The mirror lens 1100 is similar to the mirror lens 400 of FIG. 4. The x-axis cross-section view 1101 shows that the mirror lens 1100 can be asymmetric along the x-axis 104. Moving from left to right along the x-axis 104, also referred to as the horizontal axis, the constant ROC surfaces measure 10.0, 5.0, 12.0, 5.0, and 11.0 inches, respectively. The y-axis cross-section view 1102 shows that the mirror lens 1100 can be asymmetric along the y-axis 106. Moving from bottom to top along the y-axis 106, also referred to as the vertical axis, the constant ROC surfaces measure 4.5, 6.5 and 1.0 inches, respectively. The x-axis cross-section view 1101 and the y-axis cross-section view 1102 show that mirror lens 1000 is a constant wall thickness mirror lens.

FIG. 12 is a multiview orthographic projection of a mirror lens 1200. The mirror lens 1200 is similar to the mirror lens 500 of FIG. 5. The x-axis cross-section view 1201 shows that the mirror lens 1200 can be asymmetric along the x-axis 104. Moving from left to right along the x-axis 104, also referred to as the horizontal axis, the constant ROC surfaces measure 10.0, 5.0, 12.0, 5.0, and 11.0 inches, respectively. The y-axis cross-section view 1202 shows that the mirror lens 1200 can be asymmetric along the y-axis 106. Moving from bottom to top along the y-axis 106, also referred to as the vertical axis, the constant ROC surfaces measure 4.5, 6.5 and 1.0 inches, respectively. The x-axis cross-section view 1201 and the y-axis cross-section view 1202 show that mirror lens 1200 is a variable wall thickness mirror lens. The advantages of a variable wall thickness mirror lens are discussed above with respect to FIG. 2.

Figure 13:
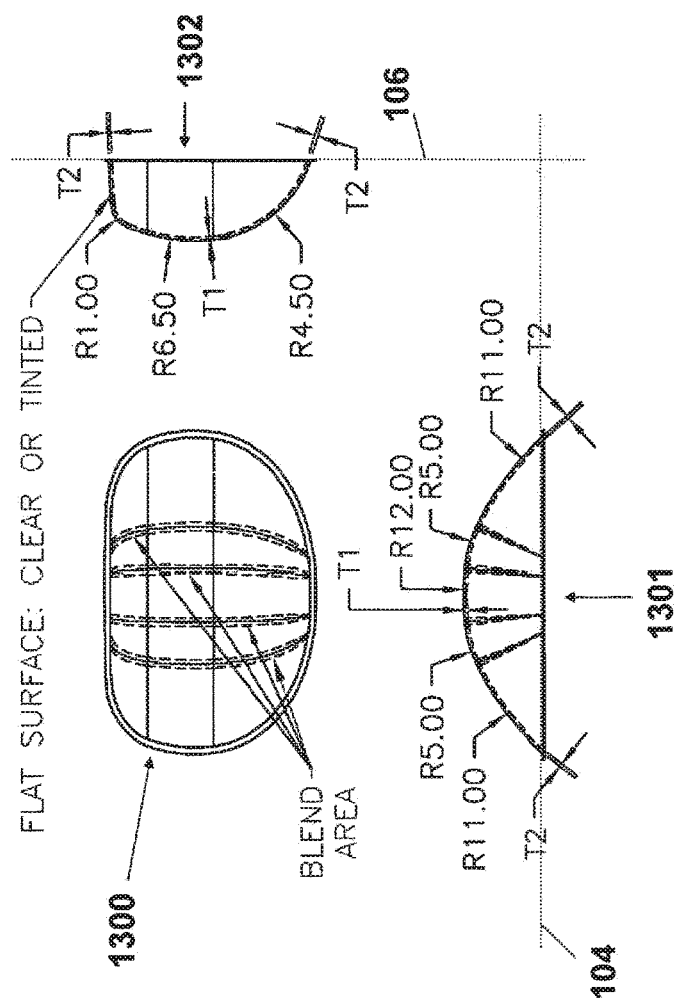
Figure 14:
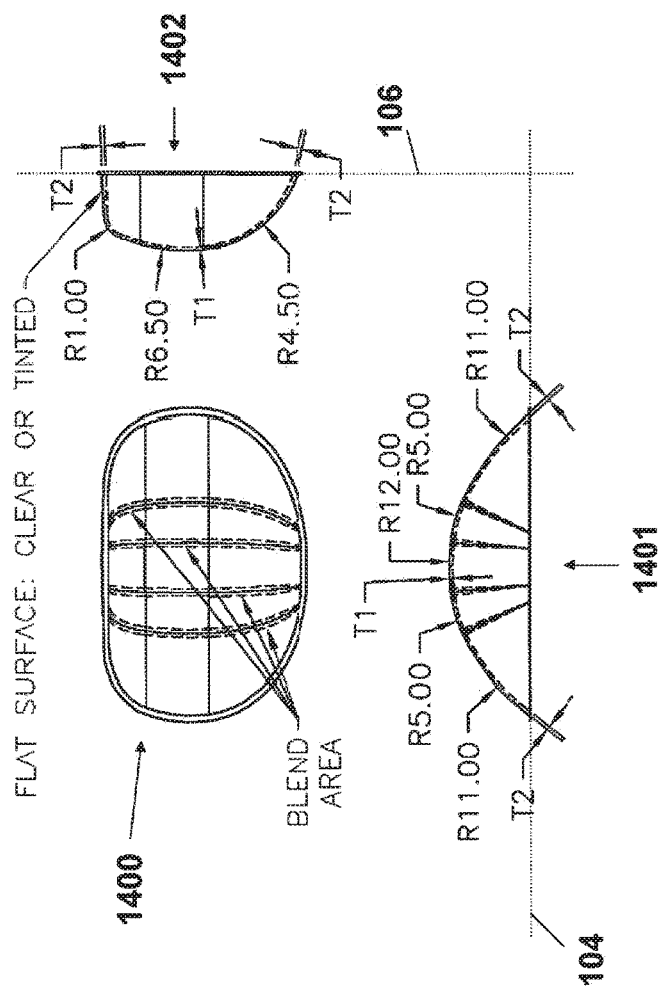

FIGS. 13 and 14 illustrate additional variations of FIGS. 4 and 5 where the mirror is symmetric along the x-axis and there is a more abrupt transition from vertical to horizontal at the top of the mirror.

FIG. 13 is a multiview orthographic projection of a mirror lens 1300. The mirror lens 1300 is similar to the mirror lens 400 of FIG. 4. The x-axis cross-section view 1301 shows that the mirror lens 1300 can be symmetric along the x-axis 104. Moving from left to right along the x-axis 104, also referred to as the horizontal axis, the constant ROC surfaces measure 11.0, 5.0, 12.0, 5.0, and 11.0 inches, respectively. The y-axis cross-section view 1302 shows that the mirror lens 1300 can be asymmetric along the y-axis 106. Moving from bottom to top along the y-axis 106, also referred to as the vertical axis, the constant ROC surfaces measure 4.5, 6.5 and 1.0 inches, respectively. The x-axis cross-section view 1301 and the y-axis cross-section view 1302 show that mirror lens 1300 is a constant wall thickness mirror lens.

FIG. 14 is a multiview orthographic projection of a mirror lens 1400. The mirror lens 1400 is similar to the mirror lens 500 of FIG. 5. The x-axis cross-section view 1401 shows that the mirror lens 1400 can be symmetric along the x-axis 104. Moving from left to right along the x-axis 104, also referred to as the horizontal axis, the constant ROC surfaces measure 11.0) 5.0, 12.0, 5.0 and 11.0 inches, respectively. The y-axis cross-section view 1402 shows that the mirror lens 1400 can be asymmetric along the y-axis 106. Moving from bottom to top along the y-axis 106, also referred to as the vertical axis, the constant ROC surfaces measure 4.5, 6.5 and 1.0 inches, respectively. The x-axis cross-section view 1401 and the y-axis cross-section view 1402 show that mirror lens 1400 is a variable wall thickness mirror lens. The advantages of a variable wall thickness mirror lens are discussed above with respect to FIG. 2.

Figure 15:
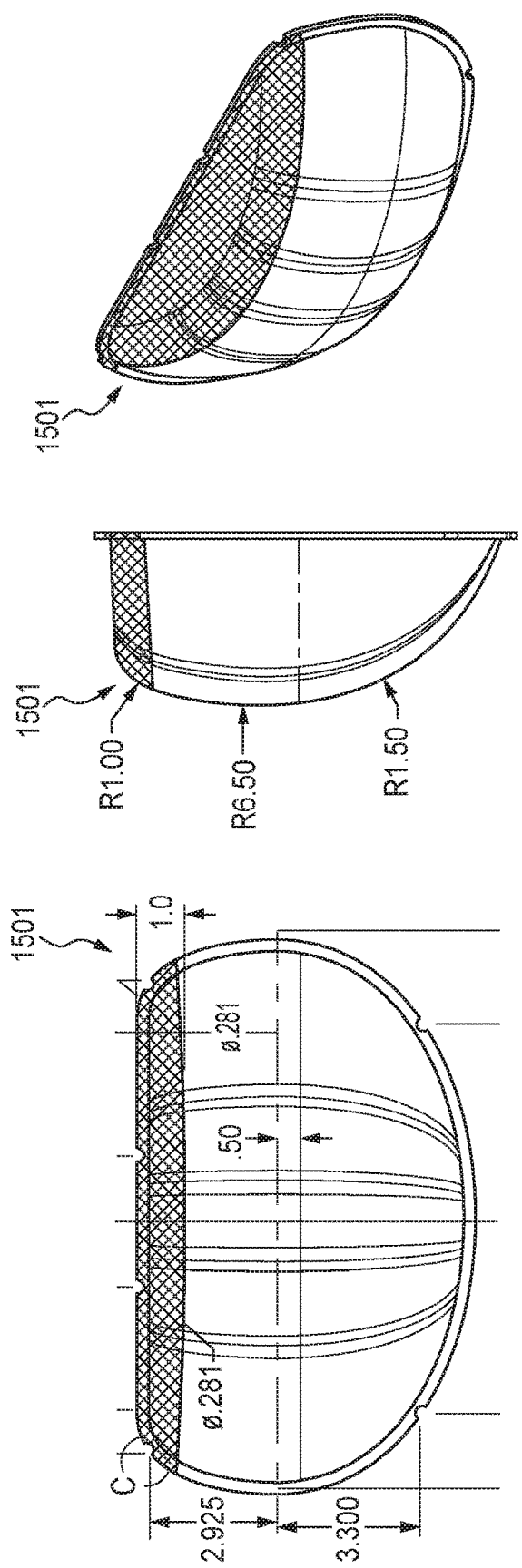
FIGS. 15A, 15B, and 15C illustrate a multiview orthographic projection of a mirror with tinting and/or texturing in accordance with one or more embodiments of the invention.
Figure 16:
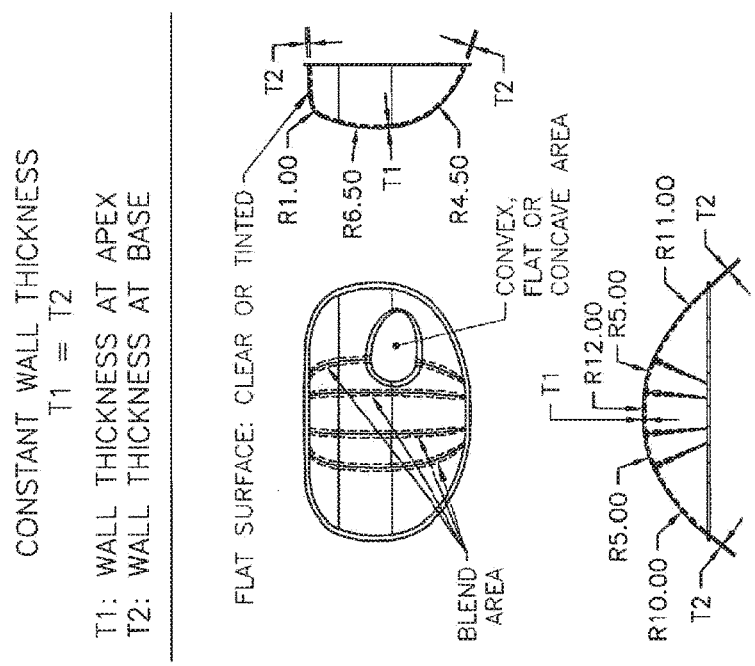
Figure 17:
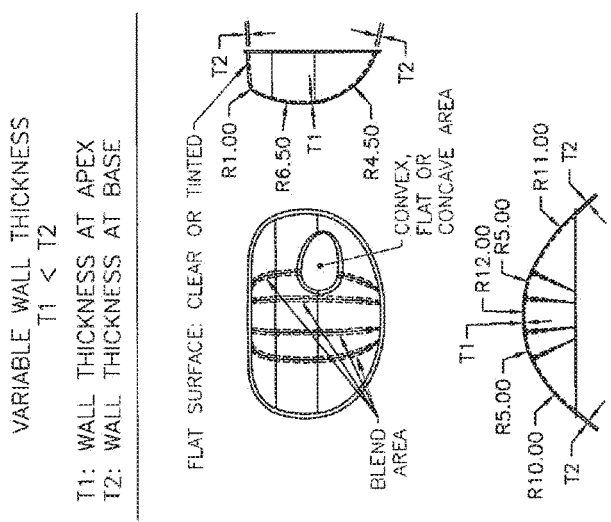

FIGS. 15A, 15B, and 15C show a multiview orthographic projection of a mirror lens 1500. Like previously described lenses, the mirror lens 1500 of FIG. 15A is asymmetric along the y-axis. Unlike previously described lenses, the top lens section along the y-axis is treated with a dark tint 1501. The overall shape of this tinting allows instant visual aligning of the mirror by being able to generally note the size of the tinting along the y-axis. In addition, the shape of the tinting generally covers areas on the mirror which show the horizon around the bus and the center of the bus itself, where obviously children will not be seen, as can be appreciated by viewing the images in FIGS. 25 through 28. The tinting also reduces glare. The dark tint section 1501 can be any non-reflective surface. During manufacturing, the entire mirror lens is generally covered with the mirror surface. Then, as an additional manufacturing step, the tinting layer is applied to the top section of the mirror.

In another embodiment, the top section of mirror lens 1500 may be opaque, not tinted. During manufacturing, the top section of the lens is masked off prior to the application of the reflective layer. After the mirror layer is applied, the top section of the lens is transparent. Then, as an additional step, the interior of the top section of the mirror is coated with an opaque layer, such as grey paint.

In another embodiment, the top section of mirror lens 1500 may be textured, not tinted. During manufacturing, the top section of the lens is masked off prior to the application of the reflective layer. After the mirror layer is applied, the top section of the lens is transparent. Then, as an additional step, exterior of the top portion of the mirror is textured. The textured surface, like the tint above, prevents glare as the top section of the mirror lens is no longer smooth. The textured surface may also be used in combination with tinting or the application of an opaque layer.

The texturing of the lens surface can occur either during the forming of the mirror lens or after the lens is fanned. For example, an optional method the fanning of the lens is Thermo-molding, discussed in more detail below. Using the Thermo-molding process a mold is machined and surfaced. The portion of the mold used to form the textured surface of the mirror lens can be constructed of a non-smooth surface. Alternatively, injection molding which also uses a machined mold may be used for form the mirror lens. The use of a mold to form the textured surface of the lens reduces the number of steps, and cost, to manufacture the mirror lens.

FIGS. 16, 17 and 18A through 18F show that localized flattening or bowing of the outer surface can be used to create unique magnification in an area on the lens to improve viewing of an image in that zone.

In further embodiments of the invention, the radii of curvature arrangement on the mirror lens can be reversed relative to the y-axis, to create a lens for the left side of the school bus, nearer the driver. That is, in the lenses previously described, images of a person standing in front of the bus are seen on the left side of the mirror and those standing alongside of the bus appear in the right hand side of the mirror. For a comparable lens placed on the left side of the bus, the locations of the persons would be reversed and, therefore, so are the mirror's different radii of curvature sections. For example, the reversed version of the mirror lens 100 of FIG. 1 would have constant ROC surfaces that measure 11.0, 5.0, 12.0, 5.0, and 9.0 inches, moving from left to right along the x-axis 104.

In further embodiment of the invention, optionally there may be blending zones between the constant ROC surfaces along the vertical axis. In further embodiments of the invention, optionally there may be variations in the blending zones 102 that create a smooth visual transition between the constant ROC surfaces 101. The blending zone 102 may include a step-wise transition, a linear transition, or a more complex curve, between the constant ROC surfaces 101. For example, in FIG. 1, the blending zone 102 between the 9.0 and 5.0 inch constant ROC surfaces 101 could include a step-wise transition. The step-wise transition could be made up of a plurality of constant and/or varying surfaces, such as three constant ROC surfaces of 8.0) 7.0. and 6.0 inches. Alternatively, the blending zone 102 between the 9.0 and 5.0 inch constant ROC surfaces 101 could include linear transition between the 9.0 and 5.0 inch constant ROC surfaces 101. In addition, the blending zone 102 between the 9.0 and 5.0 inch constant ROC surfaces 101 could include a quadratic or other higher order transition.

In further embodiments of the invention, there may also be variations in the constant ROC surfaces 101. The ROC surfaces 101 may include, partially or completely, varying ROCs including one or both of increasing and decreasing ROCs. 'The varying ROC surfaces may include a step-wise transition, a linear transition, and/or a more complex curve, between the blending zones 102, and may include any combination of increasing and decreasing varying radii of curvature.

In further embodiments of the invention, the center section of the mirror no longer has the largest radius of curvature. For example, a mirror lens similar to the mirror lens 100 could be constructed with constant ROC section that measure 9.0, 8.0, 5.0, 10.0, and 11.0 inches, respectively. Moving from bottom to top along the y-axis of the mirror the constant ROC surfaces measure 4.5, 6.5 and 5.0 inches, respectively. The mirror lens may include a constant or varying lens thickness as described in FIG. 3 above. In addition, as described above, the mirror could consist of a mix of varying ROC sections and/or constant ROC sections, where the center section of the mirror no longer has the largest ROC.

Mirror Mounting—Generally

Figures 19A, 19B:
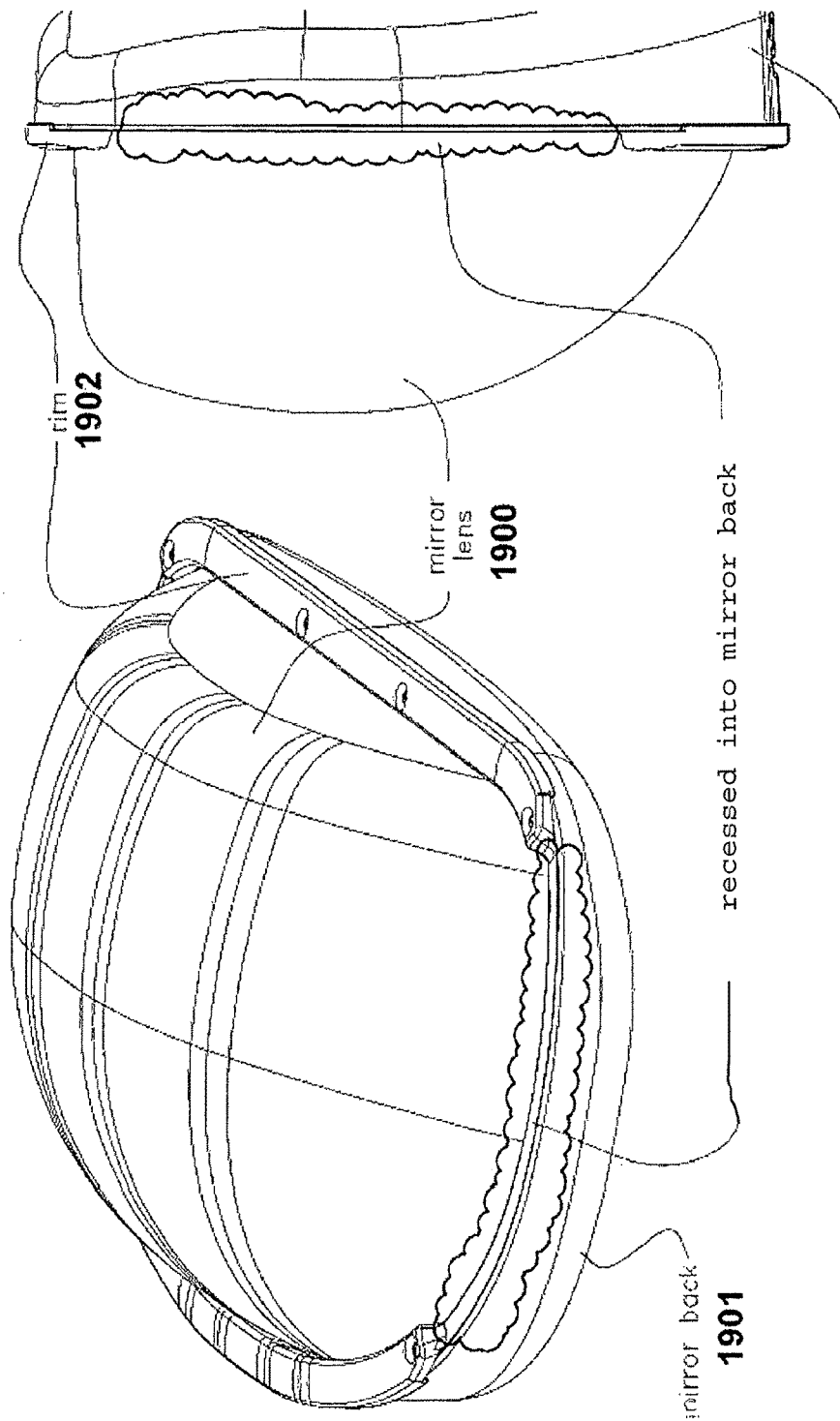
FIGS. 19A and 19B illustrate an isometric view showing a mirror lens, mirror rim, and mirror housing in accordance with one or more embodiments of the invention.

FIGS. 19A and 19B show an isometric view of an exemplary mirror lens 1900, a mirror housing 1901, and a mirror rim 1902 in accordance with an alternative embodiment of the present invention that may optionally be used in combination with the mirror lens described above. The perimetral edge of the mirror lens 1900 is sized to fit within the mirror housing 1901. The mirror lens 1900 is secured between the mirror housing 1901 mirror rim 1902 with screws or other connectors.

The mirror rim 1902 is optionally thickest along the top and bottom of the mirror. However, along the sides of the mirror, the mirror rim 1902 is advantageously thinner in order to maximize the reflective mirror surface in the horizontal direction. The additional horizontal viewing area improves the ability of the driver to see images of children milling, walking, and/or standing about alongside regions of the school bus. In an alternative embodiment, the mirror rim is thinned along the base of the mirror. This provides and expanded viewing area below the mirror, for example, in front of the bus.

FIGS. 20A, 20B, and 20C illustrate a multiview orthographic projection of an exemplary mirror lens 2000, a mirror housing 2001, and a mirror rim 2002 in accordance with alternative embodiments of the invention. The mirror lens 2000 is secured between the mirror housing 2001 mirror rim 2002 with screws or other connectors.

Figure 21A:
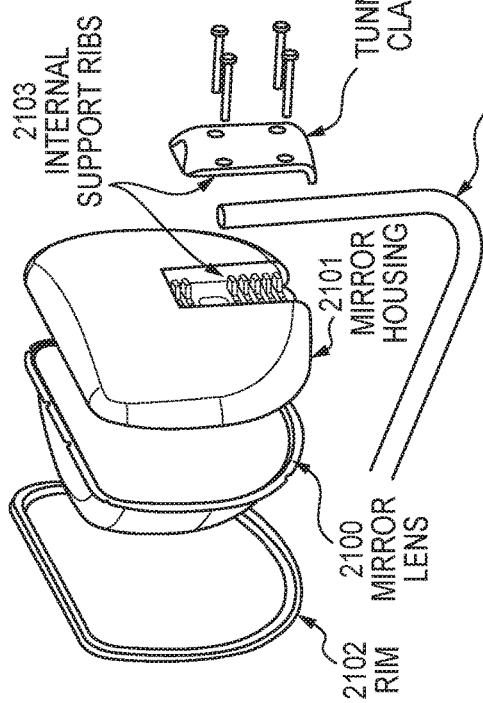
FIG. 21B is an exploded view showing both a ball stud mount and FIG. 21A illustrates a tunnel mount in accordance with one or more embodiments of the invention.
Figure 21B:
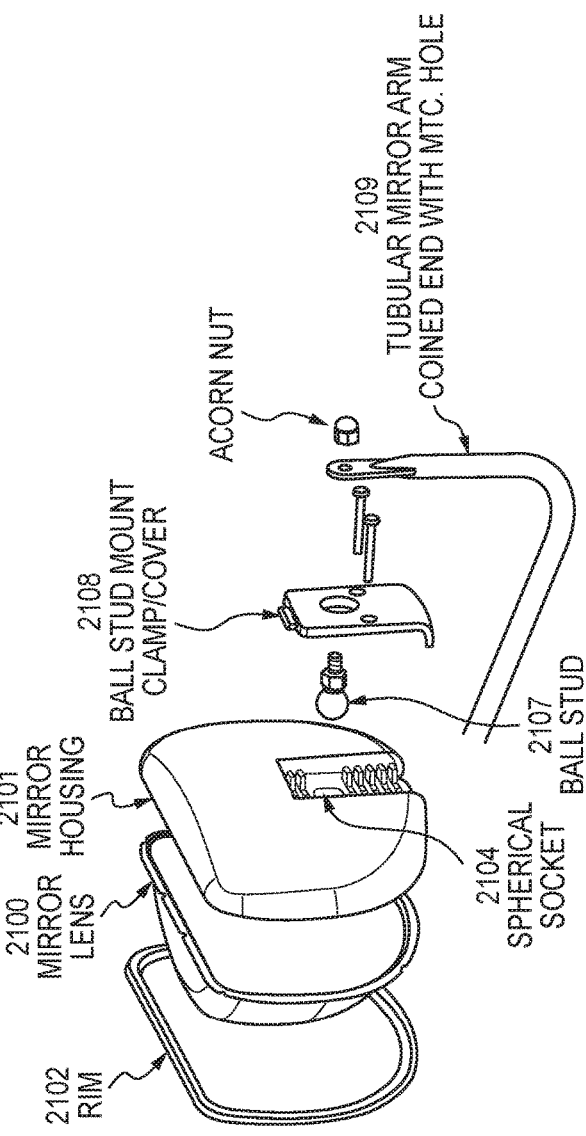

FIGS. 21A and 21B illustrate an exploded view of an exemplary mirror lens 2100, a mirror housing 2101, and a mirror rim 2102. Again, the mirror lens 2100 is secured between the mirror housing 2101 mirror rim 2102 with screws or other connectors. The rear of the mirror housing 2101 includes support ribs 2103 and a spherical socket 2104. This allows for at least two different methods (e.g., tunnel as illustrated in FIG. 21A or ball stud as illustrated in FIG. 21B) of mounting the mirror assembly to the school bus or other vehicle. This reduces the cost of producing and stocking mirrors as only a single mirror housing 2101 needs to be produced for customers that use either type of mirror mount.

When a tunnel mount is optionally used, as illustrated in FIG. 21A, a tubular mounting arm 2105 is located along the internal support ribs 2102. The mirror housing 2101 is secured to the mounting arm 2105 by a tunnel mount cover 2106. The tunnel mount cover 2106 includes additional support ribs 2103 (not shown) to hold the mounting arm 2105 securely in place.

When a ball stud mount is optionally used, as illustrated in FIG. 21B, a ball stud 2107 is placed in the spherical socket 2104. The ball stud is secured in place using a ball stud mount cover 2108. The stud portion of the ball stud protrudes through an opening in the ball stud mount cover 2108 and through an opening in the mounting arm 2109. A nut holds the ball stud 2107, the ball stud mount cover 2108, and the mounting arm 2109 together. The mounting arm 2109 may be located between the mirror housing 2101 and the ball stud mount cover 2108. In the alternative, the ball stud mount cover 2108 may be located between the mirror housing 2101 and the mounting arm 2109.

Figure 22:
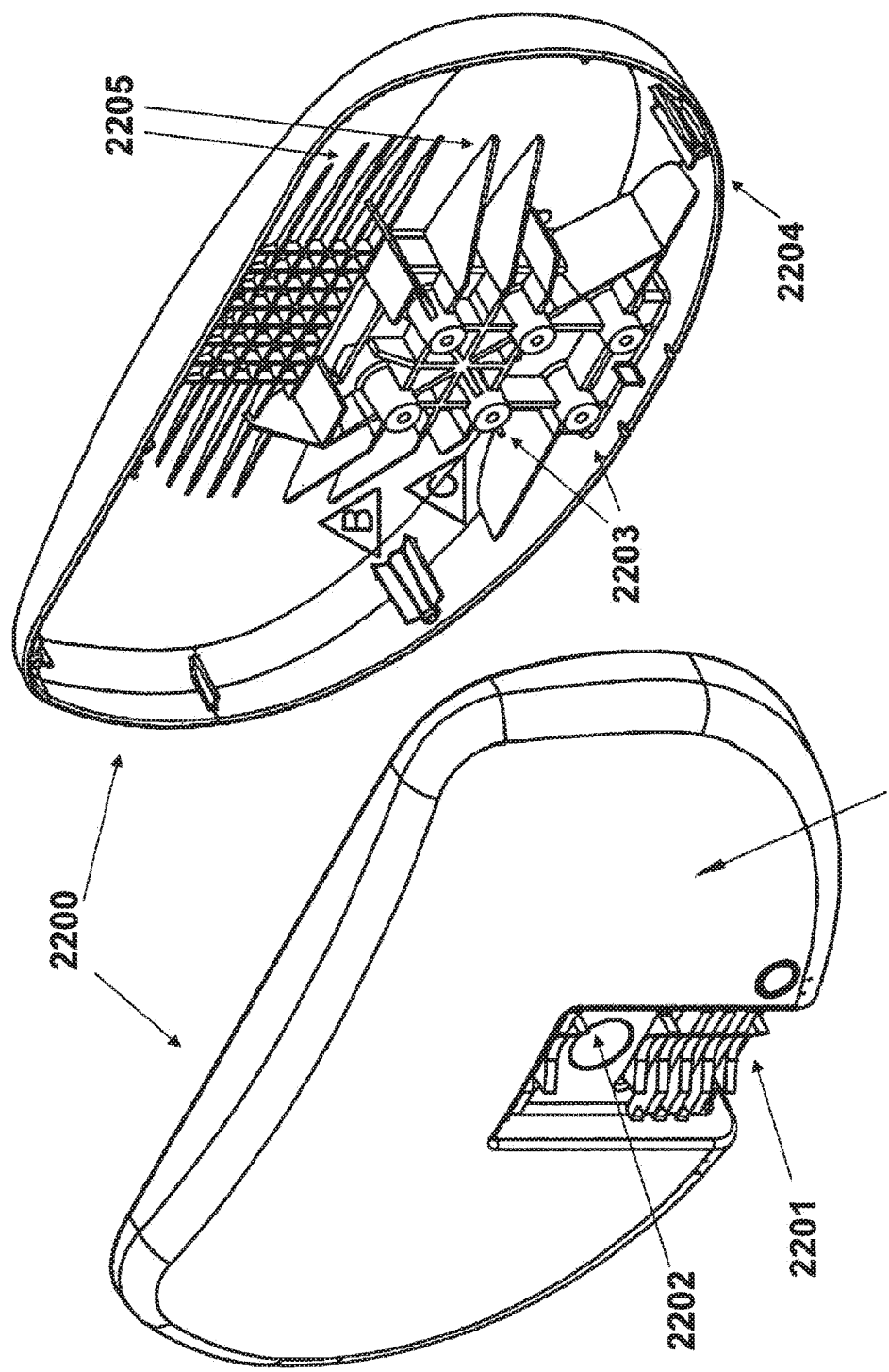
FIG. 22 is an exploded view showing the internal structure of a mirror housing in accordance with one or more embodiments of the invention.

FIG. 22 is a cutaway view of an exemplary mirror housing 2200 in accordance with alternative embodiment of the present invention. The rear of the mirror housing 2200 again includes support ribs 2201 and a spherical socket 2202. The interior of the mirror housing 2200 is also shown. The interior of the mirror housing 2200 includes mounting screw holes 2203, rim screw holes 2204, and support ribs 2205. The mounting screw holes 2203 are used to engage the screws holding the mirror housing 2200 to the mounting arm as discussed in FIG. 21. The rim screw holes 2204 are used to engage the screws holding the mirror housing 2200 to the mirror rim, as discussed in FIG. 20.

The support ribs 2205 allow for a thinner mirror housing section which decreases both the weight and manufacturing cost of the mirror housing 2200, while maintaining and/or increasing the housing strength. The support ribs 2205 are used to maintain the shape of the mirror housing 2200 while under load, such as wind loads while the vehicle is moving or while the mirror is being adjusted on the mirror mount. The support ribs are sized for the expected load. For example, the support ribs 2205 adjacent to the mounting area are larger to maintain the structural integrity of the mirror housing. The support ribs 2205 along the top and sides of the mirror housing 2200 are smaller as the loads the dynamic loads are less in these areas. The smaller support ribs 2205 in these areas, again allow for reduced weight and manufacturing cost of the mirror housing 2200.

Figure 23C:
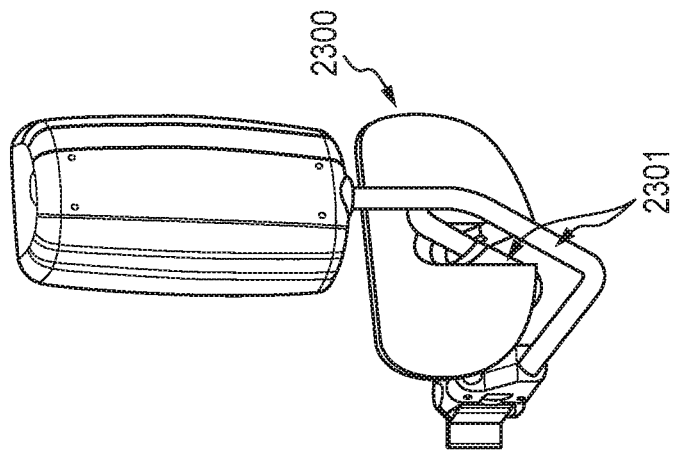
Figure 23B:
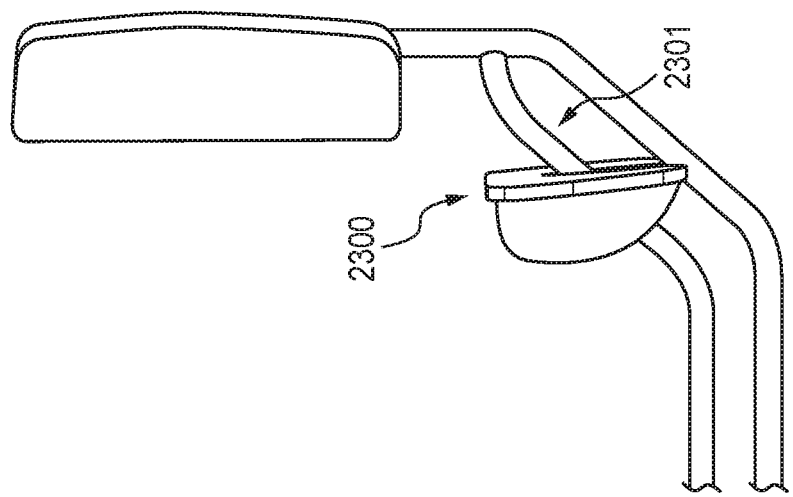
Figure 23A:
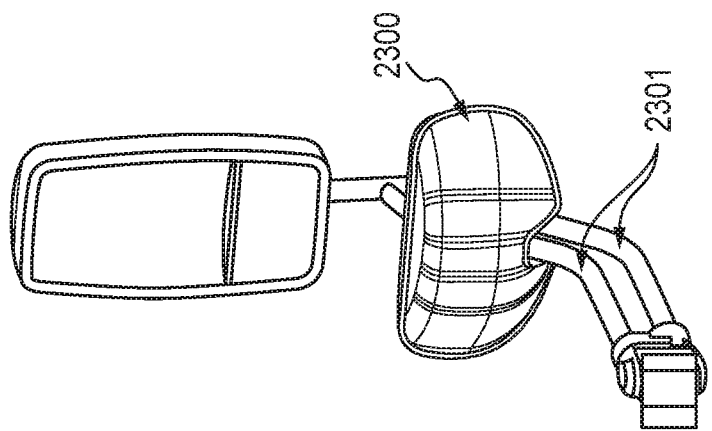

FIGS. 23A through 23C illustrate perspective views of an exemplary mirror housing 2300 in accordance with an optional embodiment of the present invention. Unlike, the mirror housing 2101 of FIG. 21, mirror housing 2300 has an angular cutout that allows the mirror housing to be mounted on a non vertical mounting arm 2301.

Figure 24C:
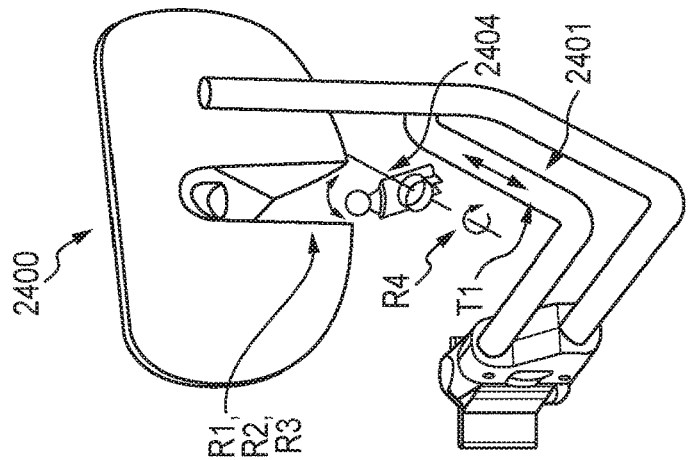
Figure 24B:
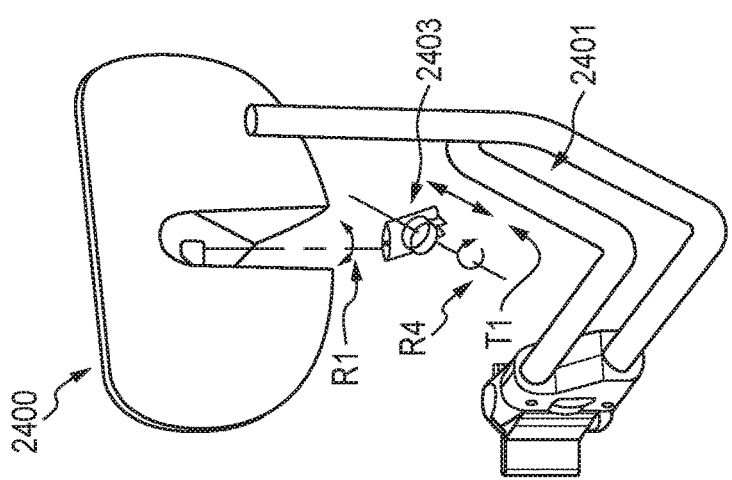
Figure 24A:
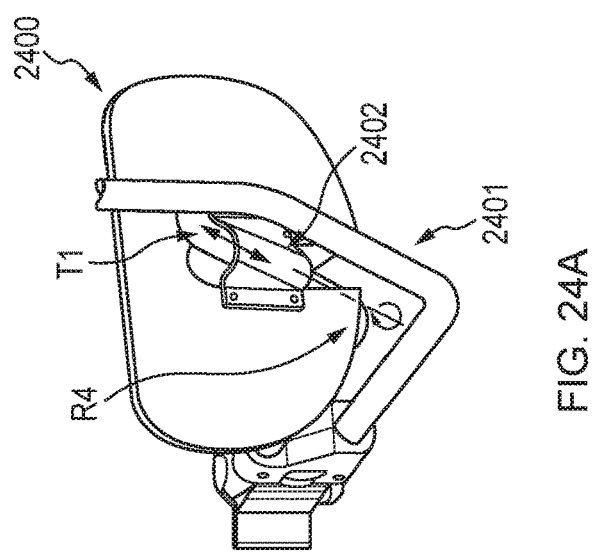
Figure 25A:
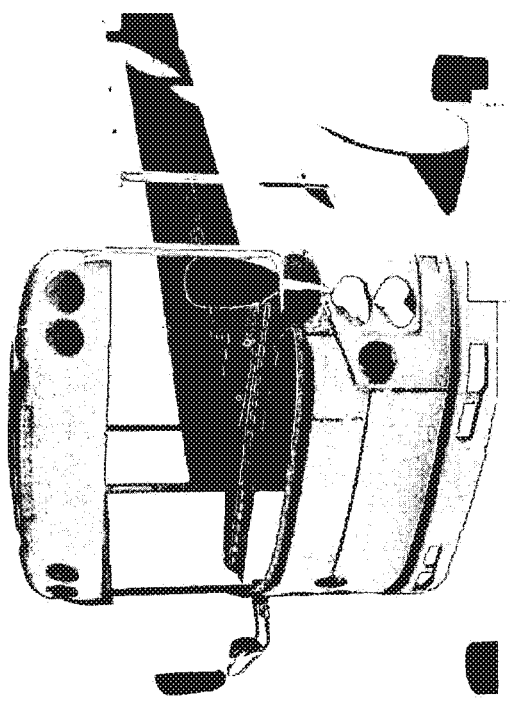
Figure 25B:
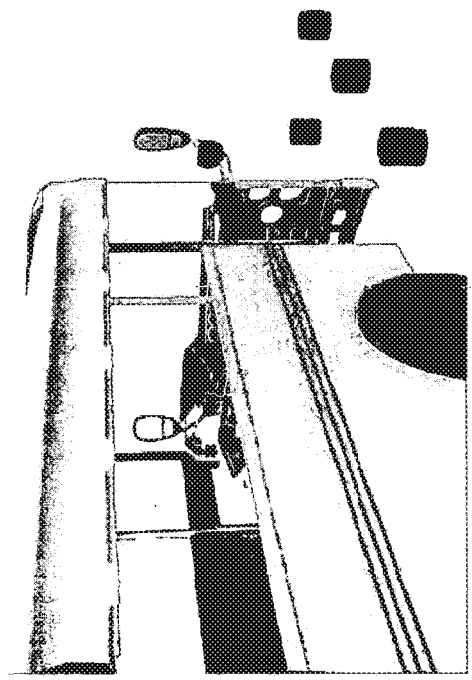
Figure 27A:
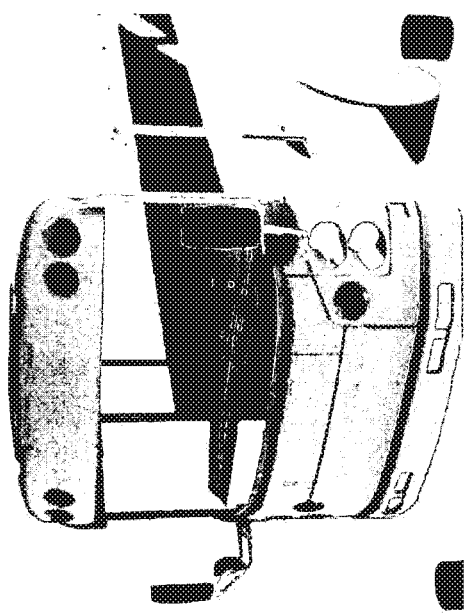
Figure 27B:
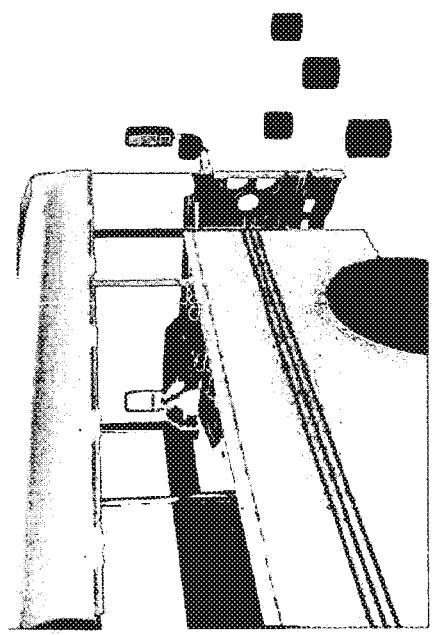

FIG. 24 is an exploded view of an exemplary mirror housing 2400, mounting arm 2401, and various mounts. FIG. 24A shows a non vertical mounting arm, 2401 that passes through the angular cutout in mirror housing 2400. The non vertical mounting arm 2401 is secured in the angular cutout by bracket 2402. The placement of the mirror housing 2401 can be adjusted in both translation and rotation around the axis of the non vertical mounting arm 2401.

FIG. 24B shows the non vertical mounting arm 2401 secured in the angular cutout by screw-clamp 2403. The screw-clamp 2403, like the bracket above 2402, allows for the mirror housing 2400 to be adjusted in both translation and rotation around the axis of the non vertical mounting arm 2401. However, the mirror housing 2400 can also be rotated in an additional dimension around the axis of the screw holding the mirror housing 2400 and the screw-clamp 2403 together.

FIG. 24C shows the non vertical mounting arm 2401 secured in the angular cutout by ball-clamp 2404. The ball-clamp like the bracket above, allows for the mirror housing 2400 to be adjusted in both translation and rotation around the axis of the non vertical mounting arm 2401. The ball-clamp 2404, unlike like the screw-clamp 2403 above, allows for the mirror housing 2400 to be adjusted in three axes of rotation around the ball joint.

The interior (not shown) of the mirror housing 2400 of FIG. 24 is similar to interior of the mirror housing 2200 of FIG. 22. The interior includes mounting screw holes, rim screw holes, and support ribs. The mounting screw holes are used to engage the screws holding the mirror housing to the mounting bracket 2402 or screw-clamp 2403. The rim screw holes are used to engage the screws holding the mirror housing to the mirror rim, as discussed in FIG. 20. In addition, the mirror housing 2400 may include a spherical socket to engage a ball-bracket mount 2404. As discussed in FIG. 22, this allows for multiple methods of mounting the mirror assembly to the school bus or other vehicle. This reduces the cost of producing and stocking mirrors, as only a single mirror housing 2101 needs to be produced for customers that use either type of mirror.

FIGS. 25A and 25B, and 27A and 27B, are perspective views of a rear view mirror assembly with an included cross view mirror. It will be apparent that any of the aforementioned mirrors can be used for either the rear view mirror assembly and cross view mirror, and any of the above described mirror mounts may optionally be used.

FIGS. 26A and 26B, and 28A and 28B are views of a rearview mirror assembly with an included cross view mirror displayed from the view of the user (e.g.: a driver's eye point view). It will be apparent that any of the aforementioned mirrors can be used for either the rear view mirror assembly and cross view mirror.

Mirror Manufacturing—Generally

One method of forming mirror sectioned mirrors is injection molding. This process allows the production of a part, in this case a mirror, which reproduced precisely the contours of a three dimensional design that were machined into a mold. The use of a machined mold allows for the production of complex mirror shapes where sections of the mirror have different optical characteristics. In addition the mold can be textured and the texture will be reproduced on the finished part. Finally, during the cooling of the molten plastic, the mirror will shrink. The mold can be proportionally sized to account for this shrinkage so that the finished part meets the design tolerances.

Figure 29:
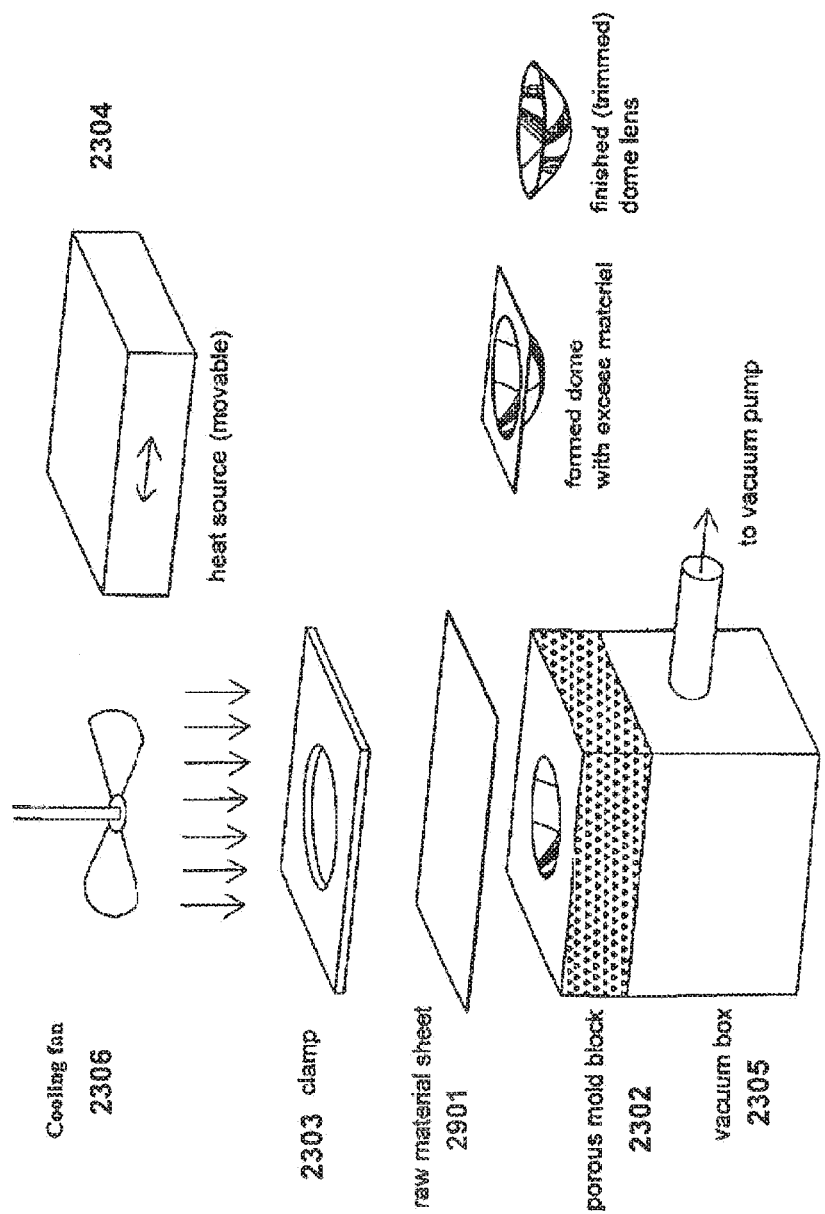
FIG. 29 is diagram of the Thermo-molding process used to manufacture mirrors in accordance with one or more embodiments of the invention.

Referring to FIG. 29, an optional method for standard Thermo-molding is illustratively displayed. The Thermo-molding process is an alternative method that may be used to manufacture the mirror lens of the present invention. The Thermo-molding manufacturing process gives the ability to produce arbitrary three-dimensional shapes from plastic sheets 2901, and preserves the optical integrity of the sheets in accordance with the mirror lens configurations described above. The resulting three-dimensional shapes are suitable for mirrors, reflectors, signs, camera domes, and other optically sensitive applications. The three-dimensional shapes can be defined using standard three dimensional CAD software. Furthermore, since the process is based on thermally molding parts starting from an initially flat sheet 2901, the tooling can be much lower cost than would be the case if a person tried to injection mold a similar part. Even if an injection molded part could be made to be dimensionally similar to the thermo-molded part, the thermo-molded part may have the additional advantages of better adhesion between the plastic and the metallization, and less distortion or other blemishes in the final product. This can provide higher quality product with better durability. The process can also permit the production of fewer parts at a reasonable cost per part, because, for example, the initial huge start-up cost of creating an injection molding tool is rendered unnecessary.

The steps in the Thermo-molding process may include: Construction/design of tooling; selection of raw materials; heating, shaping, and cooling the part; and finishing the part, as described below.

Mirror Manufacturing—Tooling

In one embodiment of the manufacturing process of the present invention, the tooling consists primarily of a machined block 2902 of porous aluminum, such as MetaPore. The block can be machined using CAD/CAM software to produce any three dimensional shape desired. In some instances, undercuts may not be able to be produced using this technique. After machining, the block can be polished to a high polish using, for example, progressively finer and finer grit sand paper. The block is fitted to a vacuum apparatus (e.g., a vacuum pump, vacuum box, roughing pump, drag pump, etc.) so that air may be drawn through the porous block, sucking the heated plastic sheet against the block, causing it to conform very precisely to the block. The block can include temperature control. For example, the block can be fitted with copper water tubes for precise uniform temperature control.

For a second surface convex mirror, a female tool can be used. For a second surface concave mirror, a male tool can be used. Just the opposite would be the case for first surface mirrors. The tooling can be constructed so that the metallization (e.g., the later applied layer to make the mirror reflective) can be applied to the surface that does not come into contact with the mold. This can be important because there can be some very slight tool mark-off, and it is preferred that the markings occur on the surface opposite the metallization.

Mirror Manufacturing—Raw Materials

Optical quality sheet stock can be used to achieve a finished part with optical quality sufficient for a mirror. For example, both Cyro Industries and Plaskolite make such "mirror grade" sheet stock at this time from extruded acrylic. It will be apparent that the invention is not limited to materials from these two vendors. Tests have successfully demonstrated parts thermo-molded with polycarbonate sheet. High quality sheet stock is also required as the thermo-molding process does not eliminate any defects in the sheet stock generated during the original sheet manufacturing process.

There can be a preference for sheets supplied with heat applied (e.g. with no residue leaving adhesives) poly masking (e.g., 2-3 1 nil thick) on both sides. The poly mask protects the surface integrity during shipping and handling. Furthermore, during forming, the use of the poly mask prevents the underlying sheet stock from coming in contact with the machined block 2902. With acrylics, this can work extremely well, and any tiny mold mark-off can be absorbed in the poly mask. When the poly mask is stripped off and disposed of, the mold mark-off can disappear with it leaving a pristine, optical quality, surface. However, with polycarbonate sheet stock the poly mask must stripped from both sides of the sheet prior to forming because the required forming temperature can be too high for the poly 1 nask.

Mirror Manufacturing—Heating, Shaping, and Cooling

The sheet can be clamped 2903 in a frame above the mold and heat 2904 can be applied from one side only. The heat is generally applied to the side of the sheet stock that is not going to be in contact with the mold. This permits the side of the sheet stock that is in contact with the mold to be a bit cooler. This allows the sheet stock to be hot enough to be fanned to the desired three dimensional shape, while reducing the tooling mark-off on the cooler side of the sheet.

The part is shaped by pulling vacuum 2905 through the porous metal mold 2902, sucking the sheet stock against the mold 2902 for final dimensions as well as for cooling. This can be important because with millions of tiny vacuum holes, the amount of air extracted can be roughly equal over the entire surface of the mold. Some thermoforming molds are made with solid aluminum which can be fabricated by drilling lots of little holes in solid aluminum molds. These drilled vacuum holes can produce small optical defects at the location of the drilled hole. These defects may be due to the air movement in the vicinity of the vacuum hole in addition to the fact that the plastic must literally bridge the hole. In mirrors and other optically sensitive parts, this can produce unsightly defects in the finished product. The porous metal tool 2902 used in thermo-molding can produce negligible such defects since there can be millions of microscopic holes over the entire surface of the mold.

Temperature control of the mold is important. The mold should be hot enough to permit the part to accurately conform to the mold dimensionally, but below the glass transition temperature of the polymer fanning the sheet stock. The mold temperature can be controlled by passing controlled temperature water through the mold's 2902 water tubes. This way when the hot sheet stock contacts the mold, it can begin cooling from such contact, but not too fast. Furthermore, once the vacuum process is started so as to shape the part, the heat source 2904 can be removed and a fan 2906 can blow room temperature air across the back side, thereby providing uniform cooling from both sides of the part. Plastic can shrink when it cools from forming temperature to room temperature, and if not for the vacuum holding the part and for the poly film mask, when the part shrinks it can create thousands of tiny scratches and blemishes in the surface of the part. Negligible blemishes occur in thermo-molding because the vacuum 2905 holds the part securely against the mold 2902 during cooling. In addition the poly mask absorbs any tiny mark-off and does not transmit those defects on to the finished part surface. The end result is that, when the part is cooled back to room temperature and the poly mask is stripped off, the part can have a substantially untarnished (e.g.) pristine) surface suitable for mirrors or other optically sensitive applications.

Mirror Manufacturing—Finishing

After demolding, if manufacturing a mirror, the part can be vacuum metallized to become reflective. It can be important to note that with a thermo-molded part, the adhesion between the deposited metal and the plastic is substantially better than other methods. This is because the surface being metallized can be protected with poly mask until just prior to thermo-molding. Even after thermo-molding the sheet stock may have never touched anything but hot or cold air until the metal can be deposited. So the metallized side can be substantially untarnished (e.g., pristine) as well as the side that contacted the mold, resulting in a substantially better finished mirror or other part. After metallization the part is typically back-coated to protect the metallization, and trimmed to final outer dimensions.

Again referring to FIG. 29, the basic components of the thermo-mold apparatus is illustratively displayed. In some instance, the vacuum apparatus (e.g., vacuum box) can be constructed to be large enough to define in the mold block several molding cavities, for the simultaneous fabrication of multiple parts. For example, for constructing multiple convex mirrors described above. In other instances, separate mold blocks can be provided in the vacuum box for creating each mold cavity (e.g., to attain reduced costs, easier servicing, repair and/or for better individualized control and regulation of the fabrication of each part in the same vacuum box, etc.).

While the invention has been described with reference to specific embodiments, the description is illustrative of the invention and in not to be construed as limiting. While discussed with respect to mirror mounted on a school bus, the invention can be utilized for a multitude of purposes (e.g., trucks, cars, tanks, and any other optical apparatus). Further, it is understood that the word mirror refers to any optical apparatus such as mirrors, reflectors, signs, camera domes, and other optically sensitive devices.

The invention claimed is:

1. An asymmetric mirror comprising:
a convex mirror dome lens which defines at least one substantially width-wise extending axis and at least one substantially height-wise extending axis, wherein the convex mirror dome lens is asymmetric with respect to both the width-wise extending axis and the height-wise extending axis, including a plurality of mirror lens sections arranged at least width-wise along the mirror dome lens, said plurality of mirror lens sections including:
a first mirror lens section having a first radius of curvature, located to one side relative to the height-wise axis of the mirror dome lens;
a second mirror lens section having a second radius of curvature which is different from the first radius of curvature, located to the other side of the height-wise extending axis of the mirror dome lens; and
a third mirror lens section having at least one of a third radius of curvature or a step-wise changing curvature and located between the first and second mirror lens sections and comprising a substantially narrow strip of at least one of a constant and changing curvature mirror surface joined to, and in between, said first and second sections, producing a smoothly changing image size between said first and second sections, wherein the convex mirror dome lens defines a base with a peripheral edge lying in a flat plane, and the peripheral edge of the base asymmetrically shaped which is neither circular, nor oval, nor elliptical in shape and is asymmetric with respect to both the width-wise extending axis and the height-wise extending axis.

2. The asymmetric mirror of claim 1, further comprising:
a fourth mirror lens section having at least one of a constant and changing radius of curvature located between the first mirror lens section and the third mirror lens section; and
a fifth mirror lens section having at least one of a constant and changing radius of curvature located between the second mirror lens section and the third mirror lens section.

3. The asymmetric mirror of claim 1, further comprising at least one fourth section comprising a substantially narrow strip of a changing curvature mirror surface joined with at least one of said first and second sections producing a smoothly changing image size.

4. The asymmetric mirror of claim 1, further comprising at least one fourth section comprising a substantially narrow strip of at least one of a constant and changing curvature mirror surface joined to, and in between, said first and third sections, producing a smoothly changing image size between said first and third sections.

5. The asymmetric mirror of claim 4, further comprising at least one fifth section comprising a substantially narrow strip of at least one of a constant and changing curvature mirror surface joined to, and in between, said second and third sections, producing a smoothly changing image size between said second and third sections.

6. The asymmetric mirror of claim 1, wherein the third radius of curvature is a constant radius of curvature which is larger than the first and second radius of curvature.

7. An asymmetric mirror comprising:
a convex mirror dome lens which defines at least one substantially width-wise extending axis and at least one substantially height-wise extending axis, wherein the convex mirror dome lens is asymmetric with respect to both the width-wise extending axis and the height-wise extending axis, including a plurality of mirror lens sections arranged at least width-wise along the mirror dome lens, said plurality of mirror lens sections including:
a first mirror lens section having a first radius of curvature, located to one side relative to the height-wise axis of the mirror dome lens;
a second mirror lens section having a second radius of curvature which is different from the first radius of curvature, located to the other side of the height-wise extending axis of the mirror dome lens;
a third mirror lens section having at least one of a third radius of curvature or a step-wise changing curvature and located between the first and second mirror lens sections and comprising a substantially narrow strip of at least one of a constant and changing curvature mirror surface joined to, and in between, said first and second sections, producing a smoothly changing image size between said first and second sections; and
at least one fourth section comprising a substantially narrow strip of a step-wise changing curvature mirror surface joined to, and in between, said first and third sections, producing a smoothly changing image size between said first and third sections.

8. The asymmetric mirror of claim 7, further comprising at least one fifth section comprising a substantially narrow strip of a step-wise changing curvature mirror surface joined to, and in between, said second and third sections, producing a smoothly changing image size between said second and third sections.

9. An asymmetric mirror comprising:
a convex mirror dome lens which defines at least one substantially width-wise extending axis and at least one substantially height-wise extending axis, wherein the convex mirror dome lens is asymmetric with respect to both the width-wise extending axis and the height-wise extending axis, including a plurality of mirror lens sections arranged at least width-wise along the mirror dome lens, said plurality of mirror lens sections including:
a first mirror lens section having a first radius of curvature, located to one side relative to the height-wise axis of the mirror dome lens;
a second mirror lens section having a second radius of curvature which is different from the first radius of curvature, located to the other side of the height-wise extending axis of the mirror dome lens;
a third mirror lens section located between the first and second mirror lens sections and comprising a substantially narrow strip of at least one of a constant and changing curvature mirror surface joined to, and in between, said first and second sections, producing a smoothly changing image size between said first and second sections;
a cross-view mirror dome lens;
a support panel secured to said convex mirror dome lens; and
a mounting structure attached to said support panel and adapted to be to and external surface of a vehicle for viewing objects both in front of and alongside the vehicle or both in back of and alongside the vehicle.

10. An asymmetric mirror comprising:
a convex mirror lens which defines at least one substantially width-wise extending axis and at least one substantially height-wise extending axis, wherein the convex mirror lens defines a base with a peripheral edge lying in a flat plane, and the peripheral edge of the base asymmetrical shaped which is neither circular, nor oval, nor elliptical in shape and is asymmetric with respect to both the width-wise extending axis and the height-wise extending axis, including a plurality of mirror lens sections arranged at least width-wise along the mirror lens, said plurality of mirror lens sections including:

a first mirror lens section having a first radius of curvature, located to one side relative to the height-wise axis of the mirror lens;

a second mirror lens section having a second radius of curvature which is different from the first radius of curvature, located to the other side of the height-wise extending axis of the mirror lens; and a third mirror lens comprising a substantially narrow strip of at least one of a constant and changing curvature mirror surface joined to, and in between, said first and second sections, producing a smoothly changing image size between said first and second sections.

11. The asymmetric mirror of claim 10, wherein at least one of the first, second and third radii of curvature comprises a varying radius of curvature, and at least another of the first, second and third radii of curvature comprises a constant radius of curvature.

12. The asymmetric mirror of claim 10, wherein the third radius of curvature is a constant radius of curvature which is larger than the first and second radius of curvature.

13. The asymmetric mirror of claim 10, further comprising:

a fourth mirror lens section having at least one of a constant and changing radius of curvature located between the first mirror lens section and the third mirror lens section; and a fifth mirror lens section having at least one of a constant and changing radius of curvature located between the second mirror lens section and the third mirror lens section.

14. The asymmetric mirror of claim 10, wherein the convex mirror lens is asymmetric with respect to both the width-wise extending axis and the height-wise extending axis.

15. The asymmetric mirror of claim 10, further comprising at least one fourth section comprising a substantially narrow strip of a changing curvature mirror surface joined with at least one of said first and second sections or said second and third sections producing a smoothly changing image size.

16. The asymmetric mirror of claim 10 further comprising at least one fourth section comprising a substantially narrow strip of at least one of a constant and changing curvature mirror surface joined to, and in between, said first and third sections producing a smoothly changing image size between said first and third sections.

17. The asymmetric mirror of claim 16, further comprising at least one fifth section comprising a substantially narrow strip of at least one of a constant and changing curvature mirror surface joined to, and in between, said second and third sections, producing a smoothly changing image size between said second and third sections.

18. The asymmetric mirror of claim 10, further comprising at least one fourth section comprising a substantially narrow strip of a step-wise changing curvature mirror surface joined to, and in between, at least one of said first and third sections or said second and third sections, producing a smoothly changing image size between said first and third sections.

* * * * *